US011954258B1

(12) United States Patent
Agrawal et al.

(10) Patent No.: US 11,954,258 B1
(45) Date of Patent: Apr. 9, 2024

(54) RENDERING AI-BASED HAPTIC FEEDBACK WITH RECOMMENDATIONS IN A VR ENVIRONMENT

(71) Applicant: SONY GROUP CORPORATION, Tokyo (JP)

(72) Inventors: Sachin Agrawal, Bengaluru (IN); Ayush Kumar Ghadiya, Bengaluru (IN); Tushar Rasal, Bengaluru (IN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/326,752

(22) Filed: May 31, 2023

(51) Int. Cl.
  *G06F 3/00* (2006.01)
  *G06F 3/01* (2006.01)
  *G06F 3/16* (2006.01)
  *G06T 7/246* (2017.01)

(52) U.S. Cl.
  CPC .............. *G06F 3/016* (2013.01); *G06F 3/011* (2013.01); *G06F 3/16* (2013.01); *G06T 7/246* (2017.01); *G06T 2207/20084* (2013.01)

(58) Field of Classification Search
  CPC .. G06F 21/32; G06F 21/44; G06F 2203/0382; G06F 2203/04803; G06F 3/03545; G06F 3/038; G06F 3/04845; G06F 3/04847; G06F 3/0488; G06F 3/04883; G06F 3/04886; G06F 3/167; G06F 9/451; H04L 65/4015; H04L 65/403; H04N 7/147
  See application file for complete search history.

(56) References Cited

U.S. PATENT DOCUMENTS

| 2018/0255335 | A1* | 9/2018 | George | H04N 21/4532 |
| 2019/0096274 | A1 | 3/2019 | Solomon et al. | |
| 2022/0086205 | A1* | 3/2022 | LeBeau | G06F 3/0233 |

OTHER PUBLICATIONS

Sun, et al., "Augmented tactile-perception and haptic-feedback rings as human-machine interfaces aiming for immersive interactions", Nature Communications, Sep. 5, 2022, 13 pages.

Huang, et al., "Multi-Player Immersive Communications and Interactions in Metaverse: Challenges, Architecture, and Future Directions", Arxiv, Computer Science, Multimedia, vol. 14, No. 8, Oct. 2022, 07 pages.

(Continued)

*Primary Examiner* — Insa Sadio
(74) *Attorney, Agent, or Firm* — CHIP LAW GROUP

(57) ABSTRACT

A system and method for rendering AI-based haptic feedback and recommendations in a VR environment is provided. The system detects an active VR session on a VR device that renders immersive content associated with a VR environment that includes a digital avatar and a virtual object. The system acquires the immersive content based on the detection and determines physical attributes of the virtual object, scene information associated with the VR environment, and an activity of the digital avatar based on a first network-based analysis, a second network-based analysis, a third neural network-based analysis, respectively, of the content. The system further detects an interaction between the digital avatar and the virtual object in a duration of the activity, and generates a feedback signal based on the interaction, the scene information, and the physical attributes. The system further controls a haptic device based on the feedback signal to generate a haptic feedback.

20 Claims, 12 Drawing Sheets

(56) References Cited

OTHER PUBLICATIONS

Mich Auburn Hills, "Nexteer & Tactile Mobility Honored With CES 2023 Innovation Award For Road Surface Detection & Early Intuitive Warning Software", Nexteer Automotive, Nov. 17, 2022, 4 pages.

* cited by examiner

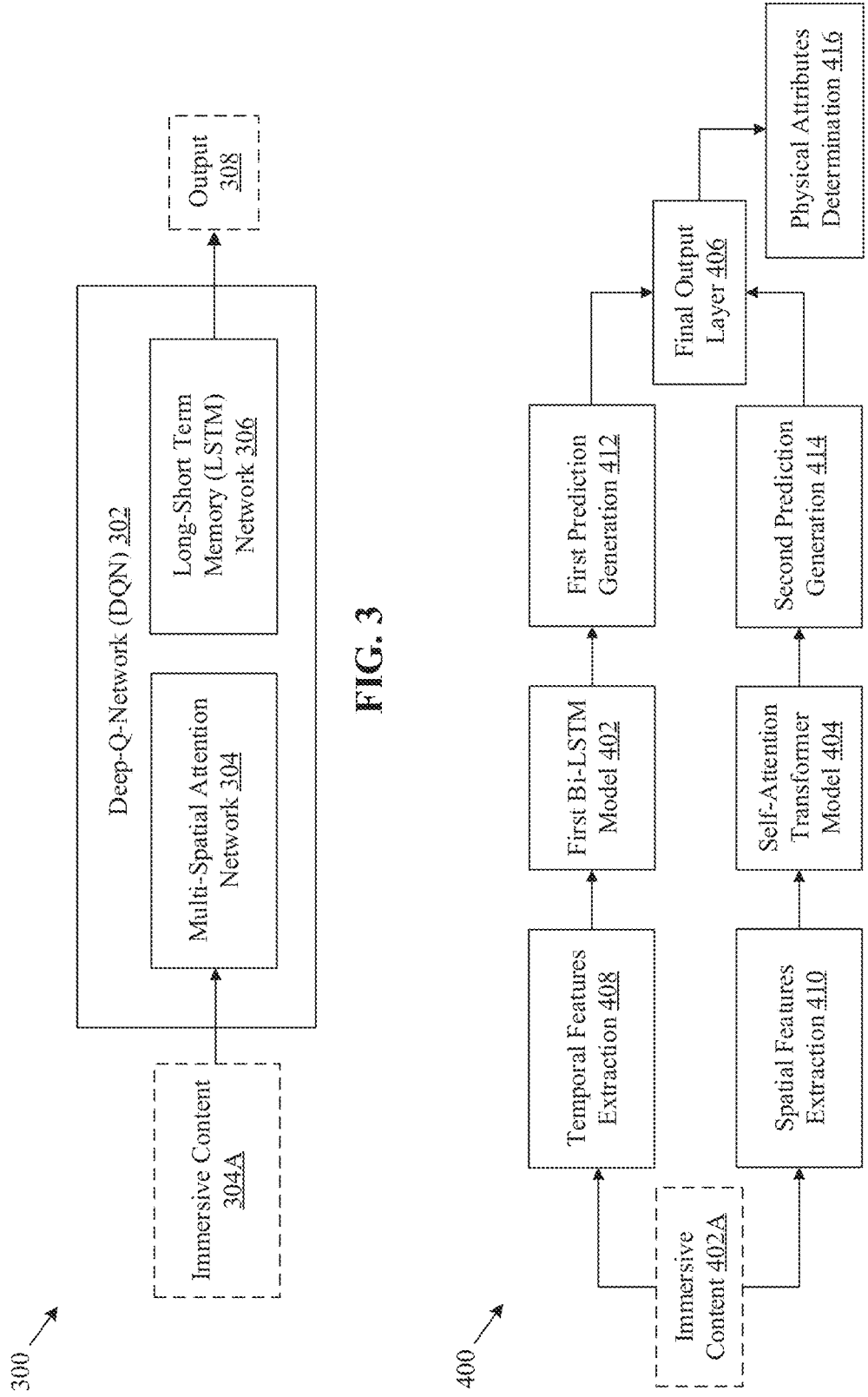

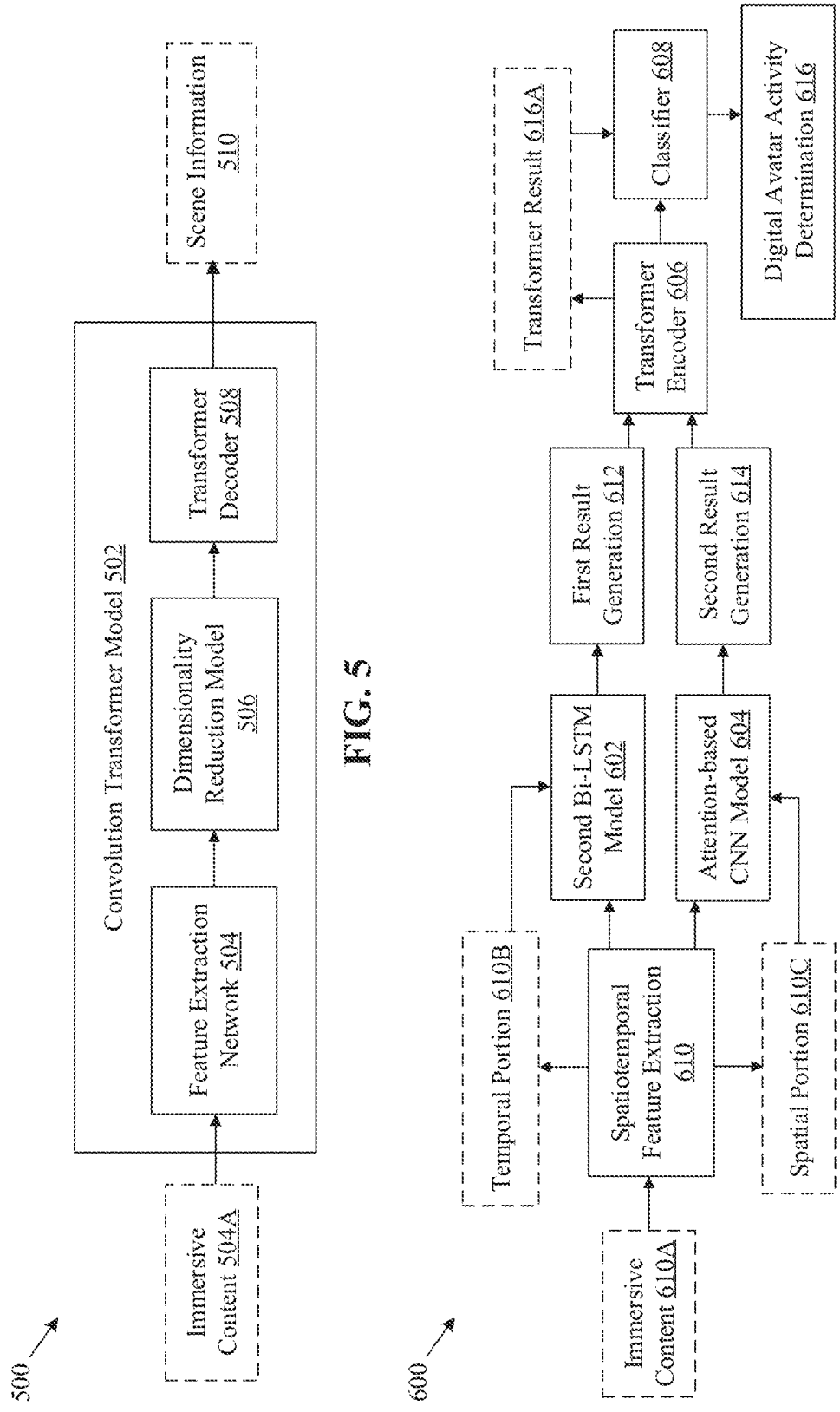

US 11,954,258 B1

RENDERING AI-BASED HAPTIC FEEDBACK WITH RECOMMENDATIONS IN A VR ENVIRONMENT

CROSS-REFERENCE TO RELATED APPLICATIONS/INCORPORATION BY REFERENCE

None.

FIELD

Various embodiments of the disclosure relate to virtual reality and sensor technology. More specifically, various embodiments of the disclosure relate to rendering of artificial intelligence (AI)-based haptic feedback with recommendations in a virtual reality (VR) environment.

BACKGROUND

Advancements in virtual reality and sensor technology have resulted in the development of virtual reality devices capable of rendering an immersive virtual environment and allowing users to manipulate avatars within the environment. Metaverse is a virtual world environment where users can interact with computer-generated objects and environments. Haptic feedback technology has grown in popularity in the metaverse in recent years. Haptic feedback gives users a tactile feedback, allowing the users to feel the virtual objects during interactions with such objects. However, current technology offers a fixed level of feedback that does not adapt to changes in the properties of such virtual objects over time. For example, if a user interacts with a virtual object that begins as soft and gradually hardens, the haptic feedback technology does not adjust to reflect this change. This lack of adaptability may result in a disconnect between the user and the virtual environment, lowering the overall user experience. Thus, there is a need for haptic feedback technology that can adapt to changes in the properties of virtual objects in the metaverse over time. This may allow the users to have a more immersive experience, increasing their overall engagement and satisfaction with the virtual environment. With the adaptive feedback, users may be able to feel changes in the virtual environment and interact with the virtual objects in a more natural and intuitive way.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and method for rendering of artificial intelligence (AI)-based haptic feedback with recommendations in a virtual reality environment, is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

FIG. 3 is a block diagram that illustrates an exemplary deep-Q-network (DQN) for detection of virtual objects associated with a VR environment, in accordance with an embodiment of the disclosure.

FIG. 4 is a block diagram that illustrates exemplary operations for determination of physical attributes of a virtual object associated with a VR environment, in accordance with an embodiment of the disclosure.

FIG. 5 is a block diagram that illustrates an exemplary convolution transformer model for determination of scene information associated with a VR environment, in accordance with an embodiment of the disclosure.

FIG. 6 is a block diagram that illustrates exemplary operations for determination of an activity of a digital avatar associated with a VR environment, in accordance with an embodiment of the disclosure.

DETAILED DESCRIPTION

Figure 1:
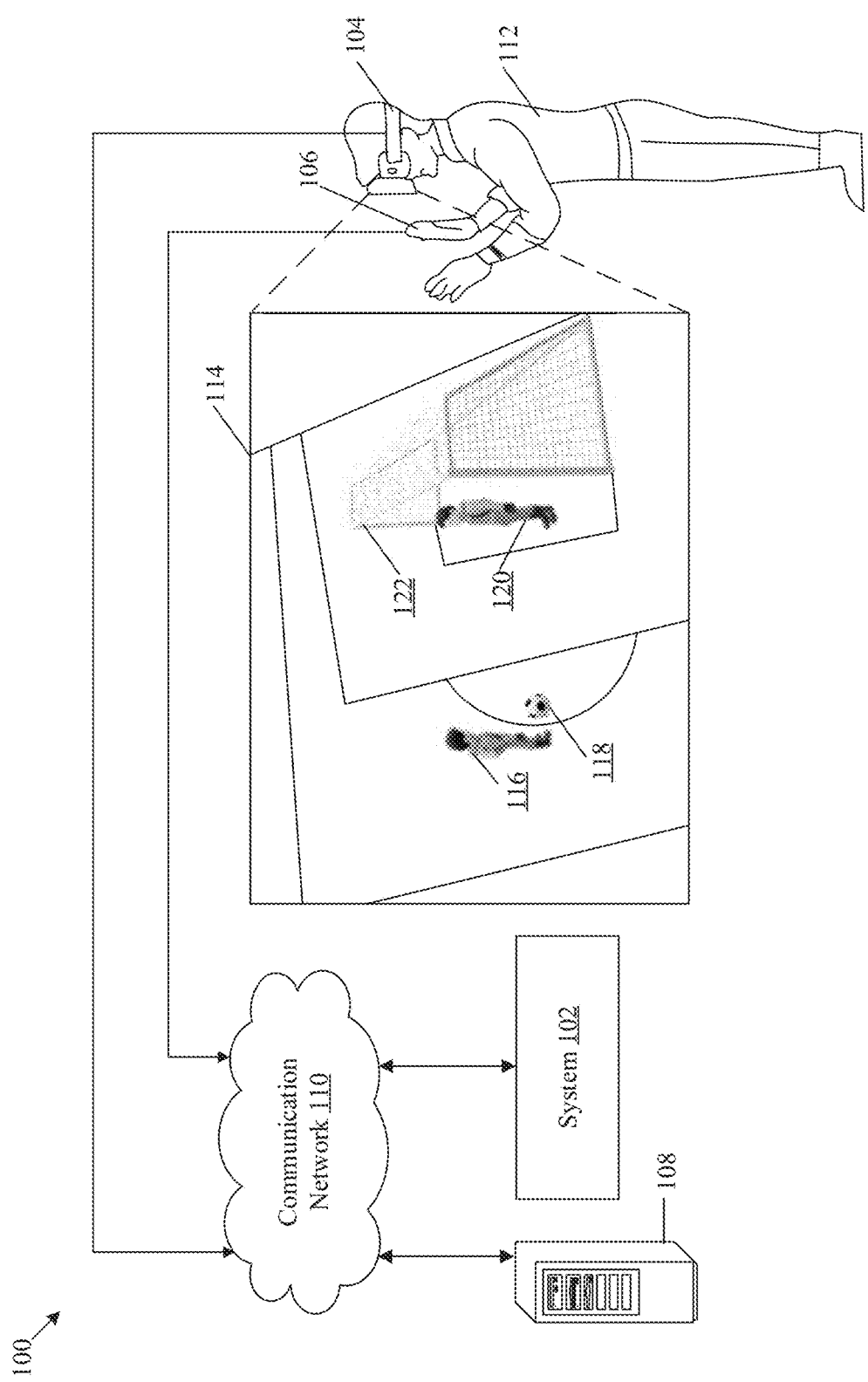
FIG. 1 is a diagram that illustrates an exemplary network environment for rendering of artificial intelligence (AI)-based haptic feedback with recommendations in a virtual reality (VR) environment, in accordance with an embodiment of the disclosure.

The following described implementations may be found in a disclosed system and method for rendering of artificial intelligence (AI)-based haptic feedback with recommendations in a virtual reality (VR) environment. Exemplary aspects of the disclosure provide a system that may include a VR device (for example, a VR headset or an eXtended Reality (XR) headset), and a haptic device (for example, a haptic glove or a haptic suit) for generation of a feedback signal and subsequent rendering of a haptic feedback. The feedback signal may be generated based on an interaction between a digital avatar that may represent a user and one or more virtual objects that may represent real-world objects in a VR environment. The generated haptic feedback may lead to an experience of tactile sensations that may be VR scene content-driven and adaptive with respect to rendered scene context and properties of such virtual objects. The tactile sensations may be realistic simulations of real-word tactile sensations that may be experienced by the user upon a physical contact between real-world counterparts of the one or more virtual objects and an anatomical portion of the body of the user.

The system may detect a VR session that may be active on the VR device and render immersive content associated with a VR environment in a duration of the VR session. The VR environment may include the digital avatar of a user who may wear the VR device and the haptic device. The VR environment may further include a virtual object that may be representative of a real-world object. Based on the detection, the system may be configured to acquire the immersive content rendered on the VR device. After the acquisition, the system may determine physical attributes (for example, hardness, roughness, or shape) associated with the virtual object based on a first neural network-based analysis of the immersive content. The system may also determine scene information (i.e., properties of a scene) associated with the VR environment based on a second neural network-based analysis of the immersive content. Further, based on a third neural network-based analysis of the immersive content, the system may determine a current activity in which the digital avatar may be engaged. In a duration of the current activity, the system may detect an interaction between the digital avatar and the virtual object. The system may be configured to generate a feedback signal based on the interaction, the scene information, and the physical attributes. Based on the feedback signal, the system may control the haptic device to generate a haptic feedback for a duration of the interaction.

Typically, a VR device may render immersive content that may be associated with a VR environment. The rendered VR environment may include virtual objects and an avatar representative of the user wearing the VR device. The VR device may interact with haptic devices, which may be worn by the user, to enable the haptic devices to generate a haptic feedback in an event of a contact (in the VR environment) between the avatar and the virtual objects and a context of a scene of the VR environment rendered on the VR device. Typically, the haptic feedback is not responsive to actions or movements of the avatar or the user, and updates or changes in the properties of the virtual objects (such as decay effects) or the VR environment (such as scene context associated with the VR environment). Further, interactions of the avatar may be restricted to a limited number of virtual objects that may be included in the VR environment. The haptic devices may need to be reconfigured each time a VR environment (for example, VR environment of a game) is updated or redesigned.

To address the abovementioned issues associated with the rendering of an immersive experience, the system may be configured to determine and track, in a duration of a VR session rendered on the VR device, one or more of attributes of virtual objects rendered in the virtual environment, scene information associated with the VR environment (i.e., context of the rendered VR environment), activities of the avatar, interactions between the avatar and the virtual objects included in the VR environment, or movements and actions of the user who may wearing the VR device (which renders the VR environment). The system may be configured to perform neural network-based analysis by use of multiple machine learning models (i.e., AI models) for the determination and tracking of the attributes of the virtual objects, scene information the interactions between the avatar and the virtual objects, the activity of the avatar, or the movement and actions of the user. Based on such determination and tracking, an adaptive haptic feedback may be generated to enrich the immersive experience of the user (wearing the VR device and the haptic device). Along with the haptic feedback, scene-based or activity specific audio content and suggestions/recommendations for actions/activities (that can be performed in the VR environment) may be rendered while the user is immersed in the VR environment.

FIG. 1 is a diagram that illustrates an exemplary network environment for rendering of AI-based haptic feedback with recommendations in a VR environment, in accordance with an embodiment of the disclosure. With reference to FIG. 1, there is shown a network environment 100. The network environment 100 may include a system 102, a VR device 104, a haptic device 106, and a server 108. The system 102 may communicate with the VR device 104, the haptic device 106, and the server 108 through a communication network 110. In the network environment 100, there is further shown a user 112 who may wear the VR device 104 and the haptic device 106 to experience and interact with objects of a VR environment 114.

The system 102 may include suitable logic, circuitry, interfaces, and/or code that may be configured to execute operations associated with rendering of haptic feedback for the user 112 and recommendations in the VR environment 114. The VR environment 114 may be rendered on the VR device 104 during an active VR session. In a duration of the active session, the system 102 may control the haptic device 106 to generate the haptic feedback, based on activities or actions of a digital avatar (which represents the user 112) in the VR environment 114 and immersive content associated with the VR environment 114. The recommendations may include, for example, actions that can be performed by a digital avatar of the user 112 in the VR environment 114 or observations associated with virtual object(s) of the VR environment 114. Examples of the system 102 may include, but are not limited to, a computing device, a smartphone, a cellular phone, a mobile phone, a gaming device, a mainframe machine, a server, a computer workstation, and/or a consumer electronic (CE) device. In accordance with an embodiment, the system 102 may include the VR device 104 and the haptic device 106.

The VR device 104 may include suitable logic, circuitry, interfaces, and/or code that may be configured to render immersive content (e.g., a metaverse with a playground) associated with the VR environment 114. In addition to the rendering of the immersive content, the VR device 104 may include one or more I/O devices that the user 112 may use to control the digital avatar in the VR environment 114.

In accordance with an embodiment, the VR device 104 may be a head-mounted display such as a VR headset or a VR helmet. The VR device 104 may include an optical system that may be responsible for projecting the immersive content on a display that may be placed in front of one or both eyes of the user 112, while wearing the VR device 104. In accordance with an embodiment, the VR device 104 may be an eyewear device or a handheld device. In an embodiment, the VR device 104 may include an inertial measurement unit for a VR experience of the user 112. Examples of the VR device 104 may include, but are not limited to, a virtual reality headset, an optical head-mounted display, an augmented reality headset, a mixed reality headset, an XR headset, virtual reality glasses, a virtual reality eye lens, or a handheld VR device.

The haptic device 106 may include suitable logic, circuitry, and interfaces that may be configured to generate a haptic feedback. The haptic feedback may be generated based on interactions (such as a contact) between the digital avatar and a virtual object included in the VR environment 114. The haptic feedback may be generated while the immersive content is rendered on the VR device 104 and for a portion of a duration of the interaction. The haptic device 106 may be worn on one or more anatomical portions of the body (such as hands, arms, chest, waist, hips, toes, or feet) of the user 112. In at least one embodiment, the haptic device 106 may be a full body suit with actuators spread throughout the surface of the suit at predefined locations. The generated haptic feedback may cause the user 112 to experience a tactile sensation on the one or more anatomical portions of user's body. In some embodiments, the haptic device 106 may include sensors, such as tactile sensors that may allow measurement of force of movement of the one or more anatomical portions of the body of the user 112 (in real-world) or pressure of a human touch on the haptic device 106 which may be in contact with the one or more anatomical portions. The sensors may detect the force or pressure during activities such as interactions of the digital avatar with the virtual object in the rendered VR environment 114. Based on the detection movement or pressure, the haptic device 106 may generate the haptic feedback.

Examples of the haptic device 106 may include, but are not limited to, a haptic glove, a wired glove with haptic actuators, a gaming glove with haptic actuators, a wearable fingertip haptic device (such as a haptic thimble or a touch thimble), a graspable haptic device (which may generate kinesthetic sensations, such as a sensation of movement, position and force in skin, muscles, tendons, and joints of a wearer), or a wearable device (which generates tactile sensations, such as a pressure, friction, or temperature in the skin of a wearer), joysticks with haptic actuators, mouse, finger pad, robotic handle, gripper, a humanoid robotic hand with haptic actuators, a wearable garment with haptic actuators, a wearable device with haptic actuators, or any device in a form of a wearable belt with haptic actuators.

The server 108 may include suitable logic, circuitry, interfaces, and/or code that may be configured to receive requests from the system 102 or the VR device 104 for immersive content that may be rendered on the VR device 104. The server 108 may be configured to store immersive content (such as gaming content, multimedia entertainment content, sports content, or an electronic health record) and stream the stored immersive content to the system 102 or the VR device 104 based on the reception of the requests. The server 108 may stream the immersive content through hyper-text transfer protocol (HTTP) requests, web applications, cloud applications, repository operations, file transfer, and the like. Example implementations of the server 108 may include, but are not limited to, a database server, a file server, a web server, an application server, a mainframe server, a cloud computing server, or a combination thereof.

In at least one embodiment, the server 108 may be implemented as a plurality of distributed cloud-based resources by use of several technologies that are well known to those ordinarily skilled in the art. A person with ordinary skill in the art will understand that the scope of the disclosure may not be limited to the implementation of the server 108, the system 102, and the VR device 104 as separate entities. In certain embodiments, the functionalities of the server 108 may be incorporated in its entirety or at least partially in the system 102 or the VR device 104, without a departure from the scope of the disclosure.

The communication network 110 may include a communication medium through which the system 102, the VR device 104, the haptic device 106, and the server 108, may communicate with each other. The communication network 110 may be a wired or wireless communication network. Examples of the communication network 110 may include, but are not limited to, Internet, a Wireless Fidelity (Wi-Fi) network, a Personal Area Network (PAN), a Local Area Network (LAN), or a Metropolitan Area Network (MAN). The system 102 may be configured to connect to the communication network 110 in accordance with various wired and wireless communication protocols. Examples of such wired and wireless communication protocols may include, but are not limited to, at least one of a Transmission Control Protocol and Internet Protocol (TCP/IP), Mobile Wireless Communication (such as 4th Generation Long Term Evolution (LTE) or 5th Generation New Radio), User Datagram Protocol (UDP), Hypertext Transfer Protocol (HTTP), File Transfer Protocol (FTP), Zig Bee, EDGE, Institute of Electrical and Electronics Engineers (IEEE) 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

In operation, the system 102 may be configured to detect a VR session that may be active on the VR device 104. The VR device 104 may render immersive content (for example, 3D virtual game content) associated with the VR environment 114 (for example, a soccer playground) in a duration of the VR session. The VR environment 114 may include the digital avatar 116 (for example, a first virtual player) of the user 112, who may wear the VR device 104 and the haptic device 106, and a virtual object 118 (for example, a virtual soccer ball) that may be representative of a real-world object (i.e., an actual soccer ball) in the VR environment 114. As shown, for example, the VR environment 114 may further include another digital avatar (for example, a second virtual player 120) and a virtual object (for example, a virtual goal post 122).

In accordance with an embodiment, the system 102 may receive a user input indicative of a selection of a virtual player (i.e., the first virtual player or the second virtual player 120) as the digital avatar of the user 112. Based on the user input, the first virtual player may be selected as the digital avatar 116 of the user 112. At a future time-instant, the second virtual player 120 can be selected as the digital avatar 116 of the user 112.

The system 102 may be configured to acquire the immersive content based on the detection of the VR session. The immersive content may be acquired from the VR device 104 for a neural network-based analysis of the immersive content. The acquisition of the immersive content may correspond to extraction of a set of frames of the immersive content that may be rendered on the VR device 104 during the active VR session. The frames may include 3D data frames and/or 2D images of the scene(s) depicted in the VR environment 114. Additionally, or alternatively, the acquisition of the immersive content may correspond to extraction of audio included in the immersive content.

After the acquisition, the system 102 may be further configured to determine physical attributes associated with the virtual object 118 based on a first neural network-based analysis of the immersive content. Each frame of the set of frames may be analyzed separately and the analysis may enable extraction of spatial features associated with each frame of the set of frames. For each frame of the set of frames, the system 102 may determine a correlation between a corresponding frame and one or more frames of the set of frames that precede or succeed the corresponding frame. The extraction of the temporal features associated with the corresponding frame may be based on the determined correlation.

In accordance with an embodiment, the first neural network-based analysis may include an application of a self-attention transformer model on the spatial features that may be extracted from each frame of the set of frames. The application may generate a first output. The first neural network-based analysis may further include application of a bi-directional long-short term memory (Bi-LSTM) model on the temporal features that may be extracted from each frame of the set of frames. The application may generate a second output. Each of the first output and the second output may be a score vector, for example. The components of the score vector may indicate a confidence related to a presence of a set of physical attributes (such as roughness or hardness) in the virtual object 118. The physical attributes associated with the virtual object 118 may be determined based on the first output and the second output.

The system 102 may be further configured to determine scene information associated with the VR environment 114 based on a second neural network-based analysis of the immersive content. The second neural network-based analysis may be performed based on an application of an attention-based convolutional neural network (CNN) on each extracted frame of the set of frames (i.e., the acquired immersive content). The scene information may correspond to a scene context that may be determined based on impact of one or more conditions such as a weather in the VR environment 114, a ground condition or type, a number of spectators, a number of players on the playground, and a time of day (when a soccer game is taking place) on the VR environment 114. Examples of the scene context may include, but are not limited to, a beach, a sports playground, a stadium, a concert hall, a city street, or a medical facility. Based on the application of the attention-based CNN, a set of feature vectors may be generated. Each feature vector may be representative of a condition that may be impacting the scene context. Thereafter, a self-attention-based transformer decoder model may be applied on the determined set of feature vectors to determine the scene information.

The system 102 may be further configured to determine an activity that the digital avatar 116 may be engaged in at a time-instant based on a third neural network-based analysis of the immersive content. The time-instant may be within a duration of the active VR session and the digital avatar 116 may be engaged with the virtual object 118 in that duration. The third neural network-based analysis may be performed on each frame of the set of frames. Prior to the third neural network-based analysis, each frame of the set of frames may be analyzed separately for extraction of spatial features associated with each frame. Additionally, each frame may be analyzed with respect to one or more frames that precede or succeed that frame. Such analysis may be performed for extraction of temporal features associated with each frame.

In accordance with an embodiment, the third neural network-based analysis may include application of a Bi-LSTM model on the extracted temporal features of each frame of the set of frames of the acquired immersive content. Based on the application, a first result may be obtained. The third neural network-based analysis may further include application of an attention-based CNN model on the extracted spatial features of each frame. Based on such an application, a second result may be obtained. The first result and the second result may be provided as inputs to a transformer model for generation of a transformer result as output. The transformer result may indicate a set of actions that the digital avatar 116 may be engaged in at the time instant. The set of actions may represent an activity (to be determined) or may be part of the activity in which the digital avatar 116 may be engaged. For determination of each action, a classifier model may be applied on the transformer result. The classifier model may generate, as output, a score for each action of the set of actions. The action with the highest score may correspond to the activity in which the digital avatar 116 may be engaged. For example, based on the third neural network-based analysis of the set of frames, it may be determined that the activity of the digital avatar 116 is a running activity as part of a soccer match. During the activity, the digital avatar 116 may run towards the virtual object 118 (i.e., the soccer ball) for a kick.

The system 102 may be further configured to detect, in a duration of the activity, an interaction between the digital avatar 116 and the virtual object 118. The interaction may be detected based on a reception of a user input (from the user 112). The input may include a control signal to perform the interaction from one or more I/O devices (connected to the VR device 104) that control the digital avatar 116. The VR device 104 may receive the user input and may transmit an indication to the system 102 about the reception of the user input. For example, the VR device 104 may receive a user input to control the digital avatar 116 such that the digital avatar 116 contacts the virtual object 118 (i.e., the soccer ball) and the virtual object 118 moves towards another virtual object (i.e., the goal post 122). The VR device 104 may control the digital avatar 116 based on the user input to generate an interaction (for example, a kick) between the digital avatar 116 and the virtual object 118 in the duration of the activity.

In some embodiments, the system 102 may be configured to detect a movement of an anatomical portion of the body (such as the feet) of the user 112 using a sensor, which may be in contact with the anatomical portion. The VR device 104 may determine a force or pressure generated based on the movement and may control the digital avatar 116 based on the measured force or pressure to render the interaction. The system 102 may determine the force or the pressure generated by the movement and may further detected the rendered interaction.

In some embodiments, the system 102 may be configured to detect a movement of an anatomical portion of the body of the user 112 based on the interaction between the digital avatar 116 and the virtual object 118. The detection of the movement (such as a reflex action) may be concomitant with the reception of the user input (which ensures the contact between the digital avatar 116 and the virtual object 118). The system 102 may further measure a force of the movement of the anatomical portion of the body. For example, the movement of the feet of the user 112 may be detected based on the contact (i.e., interaction) between the digital avatar 116 and the virtual object 118.

The system 102 may be further configured to generate a feedback signal based on the interaction between the digital avatar 116 and the virtual object 118, the scene information associated with the rendered VR environment 114, and the physical attributes associated with the virtual object 118. The generated feedback signal may be used to render a haptic feedback, via the haptic device 106. The haptic feedback may include a touch feedback component and a thermal feedback component. While the touch feedback component may be determined based on the interaction and the physical attributes, the thermal feedback component may be determined based on the scene information.

The system 102 may be further configured to control the haptic device 106 based on the feedback signal to generate a haptic feedback within a duration of the interaction. For example, the haptic feedback may be generated for a duration of contact between the digital avatar 116 and the virtual object 118. The sensations generated by the haptic feedback may be similar to or same as the sensations that a real-world player may feel while kicking a real-world soccer ball. In accordance with an embodiment, the generated haptic feedback may include one or more of a kinesthetic feedback, a tactile feedback, or a thermal feedback.

Figure 2:
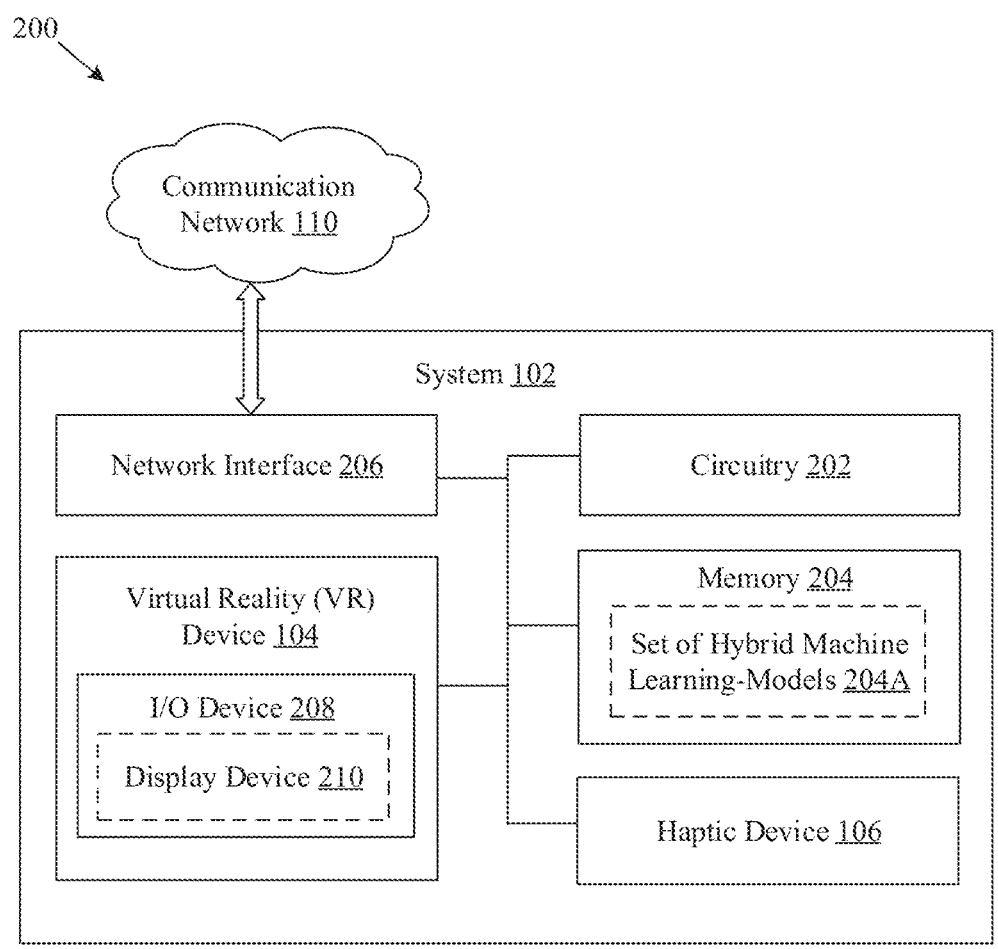
FIG. 2 is a block diagram that illustrates an exemplary electronic device for rendering of AI-based haptic feedback with recommendations in a VR environment, in accordance with an embodiment of the disclosure.

FIG. 2 is a block diagram that illustrates an exemplary electronic device for rendering of AI-based haptic feedback with recommendations in a VR environment, in accordance with an embodiment of the disclosure. FIG. 2 is explained in conjunction with elements from FIG. 1. With reference to FIG. 2, there is shown a block diagram 200 of the system 102. The system 102 may include circuitry 202, a memory 204, and a network interface 206. In at least one embodiment, the system 102 may include the VR device 104 and the haptic device 106. In at least one embodiment, the memory 204 may include a set of hybrid machine learning models (i.e., AI models) 204A. The VR device 104 may include an input/output (I/O) device 208. The I/O device 208 may include a display device 210. The circuitry 202 may be communicatively coupled to the memory 204, the network interface 206, the VR device 104, and the haptic device 106, through a wired or wireless communication interface of the system 102.

The circuitry 202 may include suitable logic, circuitry, and interfaces that may be configured to execute program instructions associated with a set of operations to be executed by the system 102. The circuitry 202 may include one or more processing units, which may be implemented as an integrated processor or a cluster of processors that perform the functions of the one or more processing units, collectively. The circuitry 202 may be implemented based on a number of processor technologies known in the art. Example implementations of the circuitry 202 may include, but are not limited to, an $x_{86}$-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 204 may include suitable logic, circuitry, and/or interfaces that may be configured to store instructions executable by the circuitry 202. The memory 204 may be configured to store predictions generated by each hybrid machine learning model of the set of hybrid machine learning models 204A. In at least one embodiment, the memory 204 may further store information associated with a rendered VR environment. The stored information may include physical attributes associated with virtual objects that may be included in the VR environment, scene information associated with the VR environment, and activities in which the digital avatar may be engaged. The circuitry 202 may retrieve the stored information for prediction of activities of the digital avatar in a currently rendered VR environment. In at least one embodiment, the memory 204 may further store a set of recommendations that may be generated as suggested activities for the digital avatar in the currently rendered VR environment. Example implementations of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

Each hybrid machine learning model of the set of hybrid machine learning models (i.e., AI models) 204A may include a combination of two or more machine learning models in a hierarchical arrangement or a flat arrangement. By way of example and not limitation, each hybrid machine learning model may include at least one of a multi-spatial attention network, an Long Short-Term Memory (LSTM) network, a Bidirectional-LSTM (Bi-LSTM) model, a self-attention transformer model, a feature extraction network, a dimensionality reduction model, a transformer decoder, an attention-based Convolutional Neural Network (CNN), a transformer encoder, a classifier model, a Hybrid Auto Encoder (HAE) model including a CNN, an LSTM network, an LSTM encoder, an LSTM decoder, and a dense layer, a Hybrid Recurrent Neural Network (HRNN) model, a Reinforcement Learning (RL)-based model, a Generative Adversarial Network (GAN) model, a collaborative filtering model, and a Self-Supervised Generative Adversarial Network (SSGAN).

In accordance with an embodiment, each model may include a neural network. A neural network may be referred to as a computational network or a system of artificial neurons which is arranged in a plurality of layers. The plurality of layers of the neural network may include an input layer, one or more hidden layers, and an output layer. Each layer of the plurality of layers may include one or more nodes (or artificial neurons). Outputs of all nodes in the input layer may be coupled to at least one node of hidden layer(s). Similarly, inputs of each hidden layer may be coupled to outputs of at least one node in other layers of the neural network. Outputs of each hidden layer may be coupled to inputs of at least one node in other layers of the neural network. Node(s) in the final layer may receive inputs from at least one hidden layer to output a result. The number of layers and the number of nodes in each layer may be determined from hyper-parameters of the neural network. Such hyper-parameters may be set before or after training the neural network on a training dataset.

Each node of the neural network may correspond to a mathematical function (e.g., a sigmoid function or a rectified linear unit) with a set of parameters that may be tunable during training of the neural network. The set of parameters may include, for example, a weight parameter, a regularization parameter, and the like. Each node may use the mathematical function to compute an output based on one or more inputs from nodes in other layer(s) (e.g., previous layer(s)) of the neural network. All or some of the nodes of the neural network may correspond to same or a different mathematical function. In training of the neural network, one or more parameters of each node of the neural network may be updated based on whether an output of the final layer for a given input (from the training dataset) matches a correct result based on a loss function for the neural network. The above process may be repeated for same or a different input until a minima of loss function is achieved, and a training error is minimized. Several methods for training are known in art, for example, gradient descent, stochastic gradient descent, batch gradient descent, gradient boost, meta-heuristics, and the like.

Each model may include electronic data, which may be implemented as, for example, a software component of an application executable on the system 102. The model may rely on libraries, external scripts, or other logic/instructions for execution by a processing device, such as the circuitry 202. For example, the neural network may rely on external code or software packages to execute on a computing device, such as the circuitry 202 and to perform machine learning tasks such as an analysis of immersive content rendered on the VR device 104 for detection and tracking of virtual objects and digital avatars in the VR environment, a determination of physical attributes associated with each of the virtual objects, a determination of scene information associated with the VR environment, a determination of activities in which the digital avatars may be engaged in the VR environment, a detection of an interaction between a digital avatar and a virtual object, a generation of recommendations that may include actions suggested for the digital avatar, and a generation of an audio content in a duration of an activity of the digital avatar.

Each model may be implemented using hardware including a processor, a microprocessor (e.g., to perform or control performance of one or more operations), a field-programmable gate array (FPGA), a coprocessor (such as an inference accelerator), or an application-specific integrated circuit (ASIC). Alternatively, each model may be implemented using a combination of hardware and software.

The network interface 206 may include suitable logic, circuitry, interfaces, and/or code that may be configured to establish a communication between the system 102, the VR device 104, the haptic device 106, and the server 108, via the communication network 110. The network interface 206 may be implemented using various known technologies to support wired or wireless communication of the system 102 with the communication network 110. The network interface 206 may include, but may not be limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The network interface 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), light fidelity (Li-Fi), Wi-MAX, a protocol for email, instant messaging, and/or Short Message Service (SMS).

The I/O device 208 (in the VR device 104) may include suitable logic, circuitry, interfaces, and/or code that may be configured to receive a user input associated with rendering of an immersive content associated with a VR environment, control a digital avatar included in a rendered VR environment, and select a digital avatar included in the rendered VR environment. Additionally, or alternatively, the I/O device 208 may render, as an output, immersive content that may include one or more digital avatars and virtual objects. The I/O device 208 may be further render a set of recommendations that may include suggested actions for a digital avatar that may represent the user 112. The I/O device 208 may include various input and output devices, which may be configured to communicate with the circuitry 202. Examples of the input devices may include, but are not limited to, a touch screen, a keyboard, a mouse, a joystick, a game controller, a brain-machine interface (BMI), a VR remote, a gesture-based controller, a wearable controller (e.g., a garment with sensors to track and record body movements), and/or a microphone. Example of the output devices may include, but is not limited to, a VR display, a flat display (such as the display device 210), or an audio reproduction device.

The display device 210 may include suitable logic, circuitry, interfaces, and/or code that may be configured to render the immersive content associated with the VR environment 114 and the set of recommendations. The display device 210 may be realized through several known technologies such as, but not limited to, a Liquid Crystal Display (LCD) display, a Light Emitting Diode (LED) display, a plasma display, and/or an Organic LED (OLED) display technology, and/or other display technologies. In accordance with an embodiment, the display device 210 may refer to a display screen of smart-glass device, a 3D display, a see-through display, a projection-based display, an electro-chromic display, and/or a transparent display.

The operations executed by the system 102, as described in FIG. 1, may be performed by the circuitry 202. Operations executed by the circuitry 202 are described in detail, for example, in FIGS. 3, 4, 5, 6, 7, 8, 9, 10, and 11.

FIG. 3 is a block diagram that illustrates an exemplary Deep-Q-Network (DQN) for detection of virtual objects associated with a VR environment, in accordance with an embodiment of the disclosure. FIG. 3 is explained in conjunction with elements from FIG. 1 and FIG. 2. With reference to FIG. 3, there is shown an exemplary block diagram 300 of a DQN agent model 302. The DQN agent model 302 may be a hybrid arrangement of a multi-spatial attention network 304 and a long short-term memory (LSTM) network 306. The circuitry 202 may detect, by use of the DQN agent model 302, virtual objects which may be representative of real-world objects in a VR environment. The VR device 104 may render immersive content 304A that may be associated with the VR environment in a VR session. The hybrid arrangement of the multi-spatial attention network 304 and the LSTM network 306 may be used to extract features from frames of the immersive content 304A. The set of frames may be used in the generation of one or more predictions (e.g., an output 308).

At any time-instant, the circuitry 202 may detect that the VR session is active on the VR device 104. Based on the detection, the circuitry 202 may acquire the immersive content 304A that is being rendered in the VR session. The circuitry 202 may be configured to detect and track virtual objects in the VR environment (rendered as the immersive content 304A on the VR device 104) throughout the duration of the VR session. For detection of the virtual objects, a set of frames of the immersive content 304A may be extracted. For example, the set of frames may include four frames in which a first frame may correspond to an instant 't', a second frame may correspond to an instant 't+1', a third frame may correspond to an instant 't+2', and a fourth frame may correspond to an instant 't+3'. Each frame of the set of frames may include one or more virtual objects. For example, the extracted set of frames may include a first virtual object (for example, an apple) and a second virtual object (for example, a cup of coffee).

In accordance with an embodiment, the virtual objects may be detected by execution of a visual tracking operation that uses the DQN agent model 302 to process the set of frames of the immersive content 304A and to generate the one or more predictions, i.e., the output 308. The one or more predictions may be generated by use of reinforcement learning to locate the one or more virtual objects for at least a subset of frames of the processed set of frames of the immersive content 304A.

Once the set of frames are extracted from the acquired immersive content 304A, the circuitry 202 may apply the multi-spatial attention network 304 on each frame of the set of frames. The multi-spatial attention network 304 may include a set of attention layers. Each attention layer of the set of attention layers may include multiple layers, viz., an input layer, one or more hidden layers, and an output layer. The circuitry 202 may apply an attention layer on each frame of the set of frames. For example, an input layer (such as a convolution layer) of a first attention layer may receive a first frame. The output of the input layer or an intermediate layer may be passed as an input to a pooling layer. A max-pooling operation or an average-pooling operation may be performed on the input of the pooling layer for generation of an output. The output of the pooling layer may be passed to a convolution layer (for example, a filter of size 7×7). Thereafter, an activation function (for example, a sigmoid function) may be applied on an output of the filter to generate a first attention layer output. Thus, an attention layer output may be generated for each frame of the set of frames. The multi-spatial attention network 304 may compute a summation of the outputs of the attention layers for generation of an output of the multi-spatial attention network 304.

The circuitry 202 may be further configured to apply the LSTM network 306 on the output of the multi-spatial attention network 304. The LSTM network 306 may include a set of LSTM blocks. Each LSTM block of the set of LSTM blocks may learn a set of features associated with each frame based on an attention layer output generated for a corresponding frame, and one or more attention layer outputs generated for one or more frames preceding the corresponding frame. Based on the learned set of features, the LSTM network 306 may determine object scores associated with the virtual objects included in the set of frames. The determined object scores may correspond to the output 308. Each of the determined object scores may be associated with a virtual object and may be determined for a corresponding frame of the set of frames. For example, a first object score for the first virtual object may be a confidence score in prediction of a presence of the first virtual object in a particular frame. The output 308 may include bounding box coordinates of a bounding box to localize the first virtual object in the frame and a class label that may indicate that the first virtual object is "apple". Similarly, a second object score associated with the second virtual object (i.e., a cup of coffee) may be determined from each frame of the set of frames.

FIG. 4 is a block diagram that illustrates exemplary operations for determination of physical attributes of a virtual object associated with a VR environment, in accordance with an embodiment of the disclosure. FIG. 4 is explained in conjunction with elements from FIG. 1, FIG. 2, and FIG. 3. With reference to FIG. 4, there is shown an exemplary block diagram 400. The exemplary block diagram 400 may include a sequence of operations that may be executed by the circuitry 202 by use of a first Bi-LSTM model 402, a self-attention-based transformer model 404, and a final output layer 406. The sequence of operations may be executed for determination of physical attributes of each virtual object that may be included in a VR environment rendered on the VR device 104. The sequence of operations that may start at 408 and may terminate at 416.

At 408, temporal features associated with a virtual object may be extracted. The virtual object may be a 3D or 2D representation of a real-world object or an object of imagination. In at least one embodiment, the circuitry 202 may be configured to extract temporal features associated with the virtual object from immersive content 402A. The immersive content 402A may be associated with the VR environment rendered on the VR device 104 during a VR session. The circuitry 202 may acquire a set of frames from the immersive content 402A and then detect the virtual object in the acquired set of frames. The temporal features of each frame of the set of frames may be extracted based on a result of a detection of the virtual object in a corresponding frame and one or more frames of the set of frames that may precede or succeed the corresponding frame.

In accordance with an embodiment, temporal features of a first frame of the set of frames may be extracted based on a correlation between a determined feature in a region of interest in the first frame, and the determined feature in regions of interest in one or more frames that precede or succeed the first frame. For example, the feature may be one of color, texture, shape, position, edge, corner, ridge, or pixel intensity. The virtual object may be detected in the region of interest in the frame and the regions of interest in the one or more frames. Similarly, the temporal features of other frames of the set of frames may be extracted. The extracted temporal features may be used to (re)-train the first Bi-LSTM model 402.

At 410, spatial features associated with a virtual object may be extracted. In at least one embodiment, the circuitry 202 may be configured to extract spatial features associated with the virtual object from the immersive content 402A. Each frame of the set of frames may be individually analyzed for detecting the spatial features of a corresponding frame. The spatial features of each frame of the set of frames may be extracted based on results of detection of the virtual object in a corresponding frame. Specifically, the spatial features of each frame may be extracted based on features such as color, texture, shape, position, edge, corner, ridge, or pixel intensity of a region of interest in the corresponding frame (in which the virtual object may be detected). The extracted spatial features may be used to (re)-train the self-attention-based transformer model 404.

At 412, a first prediction may be generated. In at least one embodiment, the circuitry 202 may be configured to generate the first prediction based on an application of the first Bi-LSTM model 402 on the extracted temporal features. The first prediction may indicate a first confidence score associated with a presence of each physical attribute of a predefined set of physical attributes in the virtual object. For example, the set of physical attributes may include lightness, heaviness, hardness, roughness, and smoothness. The first prediction may include first confidence scores that indicate an extent to which the virtual object is light, heavy, hard, rough, or smooth, respectively. The confidence score associated with a particular physical attribute for each frame may be high if the physical attribute is present in the detected virtual object, as determined based on an output of the first Bi-LSTM model 402 (i.e., the first prediction). On the other hand, the first confidence score associated with the physical attribute may be low if the physical attribute is not present in the detected virtual object.

The circuitry 202 may generate the first prediction for each frame of the set of frames based on the extracted temporal features associated with a corresponding frame of the set of frames. Thus, the generated first prediction may vary based on variations in the temporal features extracted from different frames of the set of frames. The first prediction may indicate a change in the physical attributes of the virtual object, a change in shape of the virtual object, and/or a change in portion/area of the virtual object that may be in contact with a digital avatar throughout the set of frames.

At 414, a second prediction may be generated. In at least one embodiment, the circuitry 202 may be configured to generate the second prediction based on an application of the self-attention-based transformer model 404 on the extracted spatial features. The second prediction may indicate a second confidence score associated with a presence of each physical attribute of the predefined set of physical attributes in the virtual object. The second confidence score associated with a particular physical attribute may be high or low based on presence or absence of the physical attribute in the detected virtual object, as determined based on an output of the self-attention-based transformer model 404 (i.e., the second prediction). The circuitry 202 may generate the second prediction (i.e., the second confidence score for each physical attribute) for each frame of the set of frames based on the spatial features associated with a corresponding frame of the set of frames.

At 416, the physical attributes of the virtual object may be determined based on the first prediction and the second prediction. In at least one embodiment, the circuitry 202 may be configured to determine the physical attributes of the virtual object in the set of frames based on an application of the final output layer 406 on the first prediction and the second prediction. The output of the final output layer 406 may return a mean value of the first confidence score and the second confidence score for each physical attribute of the set of physical attributes for each frame of the set of frames. Based on the mean value associated with each physical attribute, the circuitry 202 may determine whether a corresponding physical attribute is present in the virtual object that is included in the set of frames of the immersive content 402A. If the mean value is above a threshold value, it may be determined that the corresponding physical attribute is present the virtual object.

FIG. 5 is a block diagram that illustrates an exemplary convolution transformer model for determination of scene information associated with a VR environment, in accordance with an embodiment of the disclosure. FIG. 5 is explained in conjunction with elements from FIG. 1, FIG. 2, FIG. 3, and FIG. 4. With reference to FIG. 5, there is shown an exemplary block diagram 500 of a convolution transformer model 502. The convolution transformer model 502 may include a feature extraction network 504, a dimensionality reduction model 506, and a transformer decoder 508. The circuitry 202 may determine, by use of the convolution transformer model 502, scene information 510 associated with a VR environment.

At any time-instant, the circuitry 202 may acquire immersive content 504A. The acquisition may be based on a detection of an active VR session on the VR device 104 and the immersive content 504A may be rendered on the VR device 104 during the active VR session. The circuitry 202 may extract a set of frames from the acquired immersive content 504A. The feature extraction network 504 may receive the set of frames as input. In accordance with an embodiment, the feature extraction network 504 may include an attention-based CNN. In some embodiments, the feature extraction network may be a multi-convoluted geographical attention neural network. The multi-convoluted geographical attention neural network may extract both local and global information (i.e., the features) in an input sequence (i.e., the set of frames), leading to an improved performance. The multi-convoluted geographical attention neural network may capture long-range dependencies in the set of frames and apply multiple convolutional filters simultaneously on the set of frames to capture local dependencies. This may enable the multi-convoluted geographical attention neural network to effectively model both short-term and long-term dependencies in the set of frames.

The feature extraction network 504 may extract feature vectors from each from the set of frames. For each frame of the set of frames, a feature vector may be extracted for one or more feature categories (such as color, texture, shape, edge, ridge, corner, intensity, and so on) of a corresponding frame. The extraction may be based on an analysis of all regions (i.e., pixels) or certain regions of interest in the corresponding frame. The attention-based CNN or the multi-convoluted geographical attention neural network (i.e., the feature extraction network 504) may generate, as output, a set of feature vectors associated with the set of frames (each feature vector may be associated with each frame).

In some embodiments, the circuitry 202 may determine an importance of features in each feature vector of the set of feature vectors. The importance may be determined based on an impact of the features on a detection of physical attributes of a virtual object detected in the set of frames and in tracking an action or activity of a digital avatar rendered in the set of frames. For determination of the importance of the features, the circuitry 202 may perform a pairwise correlation analysis and clustering analysis on the features. For each feature, a correlation may be determined between the corresponding feature and other features. The clustering analysis may involve creation of feature clusters. Thereafter, a permutation analysis may be performed to assess an ability of each cluster to discriminate between different groups or classes of features included in a dataset. The permutation analysis may involve randomly permuting group labels included in the dataset (that includes the features) for a predefined number of times, and recalculating clustering and discriminative power of each cluster for each permutation. For each feature cluster, an average discriminative power across all permutations may be computed. Further, the feature clusters may be ranked based on the average discriminative power of the feature clusters. The features included in the top-ranked clusters may be determined as features of importance. The permutation analysis may be repeated for a predefined number of times to determine whether there are any other features of importance that may be missed and to exclude features that have been mistakenly identified as important. The outcomes of multiple permutation analyses may be combined to identify the important features.

The dimensionality reduction model 506 may receive the extracted set of feature vectors as an input. The dimensionality reduction model 506 may transform the extracted feature vectors by reducing the dimension of each feature vector of the set of feature vectors. The reduction may be necessary to lower computational complexity involved in analysis of each feature vector of the set of feature vectors and comparison between feature vectors of the set of feature vectors. The dimensionality reduction model 506 may perform a principal component analysis, a linear discriminant analysis, a non-negative matrix factorization, or a generalized discriminant analysis to transform each feature vector (i.e., reduce the dimension of each feature vector) and generate a set of transformed feature vectors.

The transformer decoder 508 may receive the transformed feature vectors from the dimensionality reduction model 506 as an input. The transformed feature vectors may be used by the transformer decoder 508 to determine the scene information 510 associated with the VR environment. In accordance with an embodiment, the transformer decoder 508 may include a self-attention mechanism, which may be used for determination of context associated with each frame of the set of frames based on a context of one or more frames preceding a corresponding frame. The context associated with each frame may include content of a scene that is depicted by a corresponding frame. For example, if the VR environment is associated with a 3-dimensional model (or a digital twin) of a human tooth, contents included in each frame of a set of extracted frames may indicate whether an infection is present in the tooth, condition of the tooth (i.e., fixed or broken), or a color of the tooth. The contents may be determined as scene information associated with the VR environment. On the other hand, if the VR environment is a beach area, then the scene information may indicate trees in the beach area, fruits in the trees, weather conditions in the beach area, tide levels at the beach, and so on.

FIG. 6 is a block diagram that illustrates exemplary operations for determination of an activity of a digital avatar associated with a VR environment, in accordance with an embodiment of the disclosure. FIG. 6 is explained in conjunction with elements from FIG. 1, FIG. 2, FIG. 3, FIG. 4, and FIG. 5. With reference to FIG. 6, there is shown an exemplary block diagram 600. The exemplary block diagram 600 may include a sequence of operations that may be executed by the circuitry 202 by use of a second Bi-LSTM model 602, an attention-based CNN model 604, a transformer encoder 606, and a classifier 608. The sequence of operations may be executed to determine an activity in which a digital avatar (included in a VR environment) may be engaged while the VR session is active on the VR device 104. The sequence of operations that may start at 610 and may terminate at 616.

At 610, spatiotemporal features may be extracted from immersive content 610A. In at least one embodiment, the circuitry 202 may be configured to extract the spatiotemporal features from the immersive content 610A that may be rendered on the VR device 104 during the active VR session. The rendered immersive content 610A may be associated with the VR environment in which the digital avatar may be present. The digital avatar may represent a user (for example, the user 112) and may be engaged in an activity such as a sports activity, a surgery, or a medical examination.

The circuitry 202 may acquire the immersive content 610A and may extract a set of frames from the immersive content 610A that may include the digital avatar engaged in an activity. Thereafter, the spatiotemporal features may be extracted from the immersive content 610A (i.e., from each frame of the set of frames). The extracted spatiotemporal features may include a temporal portion 610B and a spatial portion 610C. For extraction of the spatiotemporal features, the circuitry 202 may detect the digital avatar (for example, a batsman) in each frame of the set of frames. Additionally, the circuitry 202 may detect a virtual object (for example, the bat) in each frame of the set of frames and an association between the digital avatar and the virtual object (for example, the batsman holding the bat). Based on such detections, the circuitry 202 may determine the activity (for example, batting) that the digital avatar (i.e., batsman) may be engaged in. In some instances, the circuitry 202 may only detect the digital avatar (for example, a sprinter). In such a case, the activity in which the digital avatar may be engaged in may be determined as a sprinting activity.

The temporal portion 610B (i.e., temporal features) associated with each frame may be extracted based on the results associated with a detection of the digital avatar (and optionally, the virtual object) in a corresponding frame of the set of frames and one or more frames that may precede or succeed the corresponding frame. The circuitry 202 may extract features from a region of each frame of the set of frames in which the digital avatar and the virtual object may be detected. Thereafter, the circuitry 202 may determine a correlation between the extracted features in the corresponding frame and the extracted features in the one or more frames. The temporal portion 610B associated with the corresponding frame may be determined based on the determined correlation. The spatial portion 610C associated with the corresponding frame may be determined based on the features extracted from the region of the corresponding frame in which the digital avatar and the virtual object may be detected. Similarly, spatiotemporal features (i.e., the temporal portion 610B and the spatial portion 610C) may be extracted for the other frames of the set of frames.

In some embodiments, the temporal portion 610B may be used to (re)-train the second Bi-LSTM model 602 and the spatial portion 610C may be used to (re)-train the attention-based CNN model 604.

At 612, a first result may be generated for each frame of the extracted set of frames based on application of the second Bi-LSTM model 602 on the temporal portion 610B for the corresponding frame. In at least one embodiment, the circuitry 202 may be configured to generate the first result based on the application of the second Bi-LSTM model 602 on the temporal portion 610B of the extracted spatiotemporal features.

The second Bi-LSTM model 602 may recognize an activity which the detected digital avatar may be engaged in at a time-instant, based on the temporal portion 610B associated with the corresponding frame. In general, the second Bi-LSTM model 602 may be trained to recognize a set of activities based on training data. The training data may include temporal features associated with frames of immersive content that include digital avatar(s) engaged in the set of activities.

Each activity may be recognized based on an association with a subset of properties amongst a set of properties. The association of the activity with the subset of properties may be determined based on the temporal portion 610B associated with the frame. For example, the second Bi-LSTM model 602 may recognize that the digital avatar is engaged in 'batting' activity at a time-instant based on the temporal portion 610B associated with a frame of the time-instant. The activity 'batting' may be associated with a subset of properties. The association between the subset of properties and the activity of the digital avatar (i.e., holding the bat) may be determined based on the temporal portion 610B.

In accordance with an embodiment, the generated first result may be a feature vector. Each component of the feature vector may indicate a value of a property of the set of properties. For example, values of vector components representing the subset of properties associated with the activity 'batting' may be high compared to values of vector components representing other properties of the set of properties. The other properties may be associated with other activities of the set of activities.

At 614, a second result may be generated based on application of the attention-based CNN model 604 on the spatial portion 610C. In at least one embodiment, the circuitry 202 may be configured to generate the second result based on the application of the attention-based CNN model 604 (i.e., a CNN with an attention mechanism) on the spatial portion 610C of the extracted spatiotemporal features. Specifically, the second result may be generated for each frame of the extracted set of frames based on the spatial portion 610C associated with a corresponding frame of the set of frames.

The attention-based CNN model 604 may recognize an activity of the digital avatar based on the spatial portion 610C. In general, the attention-based CNN model 604 may be trained to recognize a set of activities based on training data. The training data may include spatial features associated with frames of immersive content that may include digital avatar(s) engaged in the set of activities.

In the inference stage, the attention-based CNN model 604 may recognize an activity, in which the digital avatar is engaged at a time-instant of a frame, based on association of the recognized activity with a subset of properties. The subset of properties may represent an activity that the attention-based CNN model 604 may be trained to recognize. The association of the recognized activity with the subset of properties may be determined based on the spatial portion 610C associated with the frame. In accordance with an embodiment, the generated second result may be a feature vector and each vector component of the feature vector may indicate a value of a property of the set of properties (that represents a set of activities).

At 616, an activity in which the digital avatar may be engaged in the duration of the active VR session may be determined. In at least one embodiment, the circuitry 202 may be configured to determine the activity based on the first result and the second result. The activity may be determined in two stages. In the first stage, the transformer encoder 606 may be applied on the first result and the second result to generate a transformer result 616A. For the generation of the transformer result 616A, each of the first result and the second result may be encoded into an abstract continuous representation with attention information for preservation of information associated with the activity (as recognized by the second Bi-LSTM model 602 and the attention-based CNN model 604).

In accordance with an embodiment, the transformer encoder 606 may include a multi-headed attention module, a fully connected network, and a layer normalizer. The multi-headed attention module may apply self-attention to associate each component with other components of each of the first result and the second result. An output vector generated by the multi-headed attention module (based on the first result) may be accumulated with the first result to generate a first output. Similarly, an output vector generated based on the second result may be accumulated with the second result to generate a second output.

The layer normalizer may receive, as inputs, each of the first output and the second output and may generate a first normalized residual output and a second normalized residual output. Each of the first normalized residual output and the second normalized residual output may be received by a point-wise feed-forward network (i.e., a couple of linear layers with a rectified linear unit activation function in between). An output of the point-wise feed-forward network (generated based on the first normalized residual output) may be accumulated with the first normalized residual output to generate a third output. Similarly, another output of the point-wise feed-forward network (generated based on the second normalized residual output) may be accumulated with the second normalized residual output to generate a fourth output. The transformer result 616A may be generated based on a normalization of each of the third output and the fourth output.

In the second stage, the classifier 608 may be applied on the transformer result 616A to generate a label that may indicate the activity that the digital avatar may be engaged in at the time instant. The generated label may be associated with a set of scores for the set of activities that each of the second Bi-LSTM model 602 and the attention-based CNN model 604 may be trained to recognize. Each score may indicate a likelihood of the digital avatar being engaged in a specific activity. For example, the score may be between "0" and "1". For a sports activity, a score of "1" may indicate a 100% confidence that the digital avatar is engaged in the sports activity. In such a scenario, scores for other activities of the set of activities may be "0". If the score for the activity is close to "1", the scores for other activities of the set of activities may be close to "0".

Figure 7:
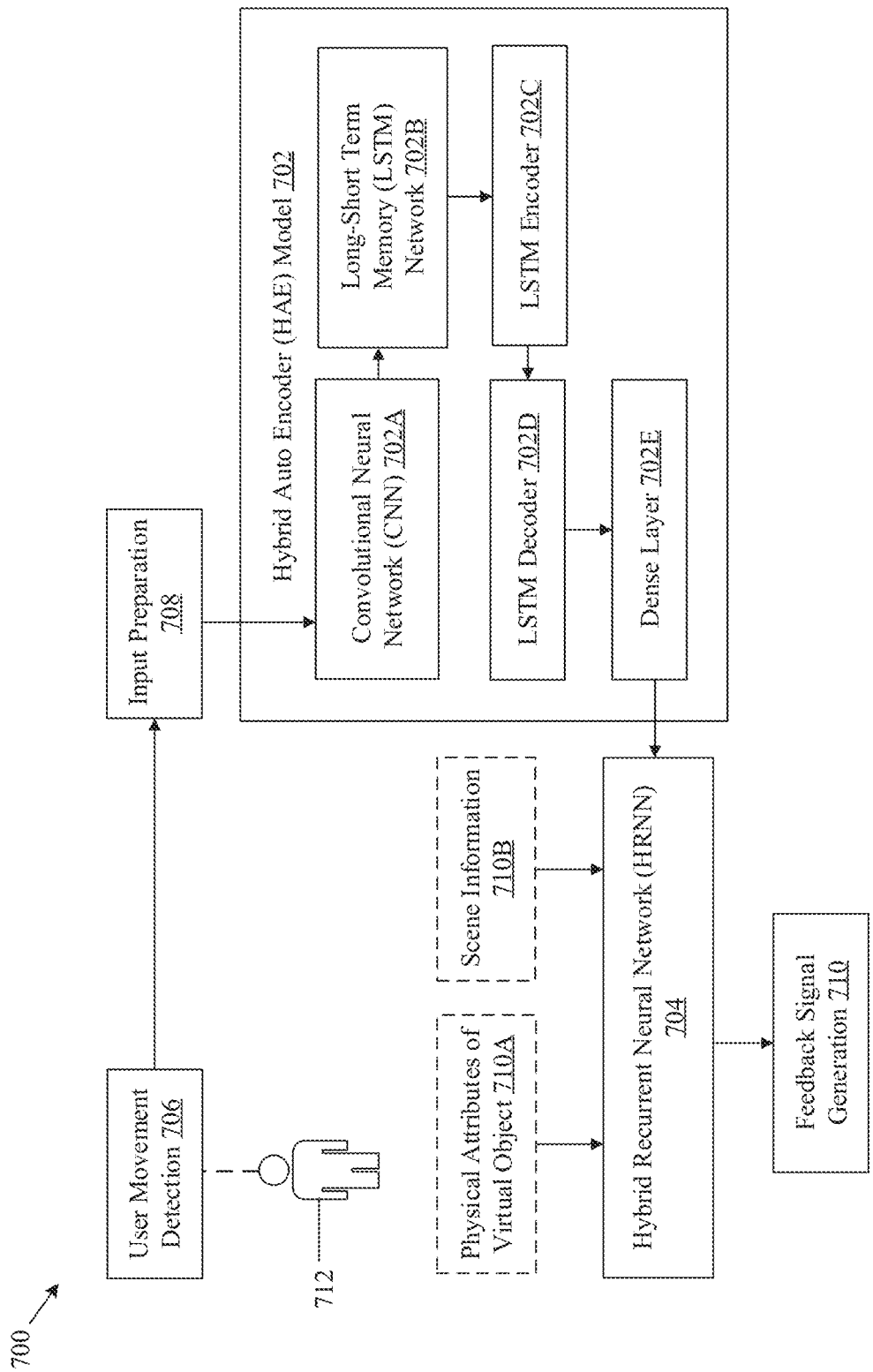
FIG. 7 is a block diagram that illustrates exemplary operations for generation of a feedback signal for rendering of an AI-based haptic feedback, in accordance with an embodiment of the disclosure.

FIG. 7 is a block diagram that illustrates exemplary operations for generation of a feedback signal for rendering of an AI-based haptic feedback, in accordance with an embodiment of the disclosure. FIG. 7 is explained in conjunction with elements from FIG. 1, FIG. 2, FIG. 3, FIG. 4, FIG. 5, and FIG. 6. With reference to FIG. 7, there is shown an exemplary block diagram 700. The exemplary block diagram 700 may include a sequence of operations that may be executed by the circuitry 202 by use of a hybrid auto encoder (HAE) model 702 and a hybrid recurrent neural network (HRNN) model 704. The sequence of operations may be executed for generation of a feedback signal that may be used to render an AI-based haptic feedback. The sequence of operations may start at 706 and may terminate at 710.

At 706, a movement of at least one anatomical portion of the body of a user (for example, the user 712) may be detected. In at least one embodiment, the circuitry 202 may be configured to detect the movement of the at least one anatomical portion of the body of the user 712. The detection of the movement may be based on an acquisition of information associated with the movement from at least one sensor that may be worn or disposed on the at least one anatomical portion. The user 712 may wear a set of sensors around different anatomical portions of the body. Such sensors may transmit a set of parameters to the system 102. Each sensor of the set of sensors may be configured to measure a specific parameter such as pressure, temperature, force, and so on. For example, a first sensor may measure a pressure applied on a handheld I/O device that includes the first sensor. A second sensor may measure a force of movement of an anatomical portion of the body. A third sensor may measure the temperature of an anatomical portion of the body in contact with on which the third sensor may be worn. Each sensor may be configured to transmit a specific parameter, which the sensor measures, to the system 102. Based on the transmission, the information associated with the movement of the at least one anatomical portion of the body of the user 712 may be acquired.

In accordance with an embodiment, the information associated with the movement may be acquired based on a detection of an interaction between a digital avatar and a virtual object included in a VR environment. The VR device 104 may render immersive content that may be associated with the VR environment and the interaction may be detected in the VR environment for a duration in which the digital avatar may be engaged in an activity. For example, a sensor in contact with the hand of the user 712 may detect a movement of the hand of the user 712 when a digital avatar (for example, a batsman) interacts with (for example, hitting) a first virtual object (for example, a ball) using a second virtual object (for example, a bat) in the VR environment (for example, a cricket field) rendered on the VR device 104. The sensor may measure a force of the movement of the hand and may transmit the measured force to the system 102 (i.e., the circuitry 202). Thus, the circuitry 202 may acquire the information (i.e., the force) associated with the movement of an anatomical portion (i.e., hand) from the sensor worn on the hand during the interaction between the digital avatar (i.e., the batsman) and a virtual object (i.e., the ball).

At 708, an input may be prepared for the HAE model 702 based on the detection. In at least one embodiment, the circuitry 202 may be configured to prepare the input for the HAE model 702 based on the acquired information associated with the movement of the at least one anatomical portion of the body of the user 712. The preparation may include, for example, a conversion of the parameter such as a force of the movement into an electrical signal. The circuitry 202 may feed the electrical signal (i.e., the prepared input) to the HAE model 702. The HAE model 702 may include, for example, a CNN 702A, an LSTM network 702B, an LSTM encoder 702C, an LSTM decoder 702D, and a dense layer 702E. The CNN 702A may perform an initial feature extraction. For instance, the CNN 702A may extract features and may provide a sequence of high-level representations that may capture relevant information included in the electrical signal. The circuitry 202 may apply the CNN 702A on the prepared input for generation of a first output. The LSTM network 702B may be applied on an output of the CNN 702A (i.e., the first output) to generate a second output. The LSTM encoder 702C may be applied on output of the LSTM network 702B i.e., the second output) to generate a third output. The LSTM encoder 702C may process the second input and may generate the third output that corresponds to a fixed-length vector representation. The third output may capture information included in the electrical signal. The LSTM decoder 702D may be applied on output of the LSTM encoder 702C (i.e., the third output) to generate a fourth output. The LSTM decoder 702D may generate the fourth output based on the third input. The fourth output may be generated at a time using another stack of LSTM layers. The circuitry 202 may feed the fourth output to the dense layer 702E for generation of a fifth output. The fifth output may be considered as output of the HAE model 702. The fifth output may correspond to a prediction that includes values of force and pressure to be applied by the haptic device 106 in an event where the digital avatar comes in a contact with the virtual object (i.e., the first virtual object or the ball) during the interaction.

At 710, a feedback signal may be generated. In at least one embodiment, the circuitry 202 may be configured to generate the feedback signal based on the determined output of the HAE model 702, physical attributes of the virtual object 710A included in the VR environment, and scene information 710B associated with the VR environment.

The circuitry 202 may extract a set of frames from the immersive content associated with the VR environment (i.e., the cricket field). In each frame of the set of frames, the circuitry 202 may detect the digital avatar (i.e., the batsman) and the second virtual object (i.e., the bat). The circuitry 202 may further detect that the digital avatar is engaged in an activity for a duration and may determine the physical attributes of the virtual object 710A based on the first neural network-based analysis (by use of the first Bi-LSTM model 402, the self-attention-based transformer model 404, and the final output layer 406) of the set of frames. The circuitry 202 may further determine the scene information 710B based on second neural network-based analysis (by use of the convolution transformer model 502) of the immersive content.

The physical attributes of the virtual object 710A and the scene information 710B may be determined for each frame of the set of frames. Further, the output of the HAE model 702 may be generated for a subset of frames of the set of frames. This may be because the prepared input may be fed to the HAE model 702 based on the detection of the interaction (hitting the ball with the bat) between the digital avatar (the batsman) and the first virtual object (the ball). The movement of the at least one anatomical portion of the body of the user 712 may be detected during the interaction, and the interaction may take place for a fraction of the duration in which the digital avatar may be detected to have engaged in the activity (such as holding the bat). For example, the engagement of the digital avatar in the activity may be detected in each frame of the set of frames (based on the third neural network-based analysis of the immersive content using the second Bi-LSTM model 602, the attention-based CNN model 604, the transformer encoder 606, and the classifier 608). Whereas the interaction (hitting the ball) may be detected in the subset of frames.

For generation of the feedback signal, the HRNN model 704 may be applied on the physical attributes of the virtual object 710A, the scene information 710B, and the output of the HAE model 702. The feedback signal may be generated as an output of the HRNN model 704 for the subset of frames, since the HRNN model 704 may receive the output of the HAE model 702 during the rendering of the subset of frames. The feedback signal generated during the rendering of a frame of the subset of frames may depend on a feedback signal that may have been generated during the rendering of a preceding frame. The generated feedback signal may include a touch feedback component and a thermal feedback component. The circuitry 202 may generate a haptic feedback in an event when the digital avatar contacts the first virtual object (i.e., the ball) via the second virtual object (i.e., the bat) to hit the ball (i.e., interact with the first virtual object). The haptic feedback may be generated based on the physical attributes of the virtual object 710A, the scene information 710B, and the interaction (i.e., hitting of the ball with the bat) between the digital avatar (i.e., the batsman) and the first virtual object (i.e., the ball). The generated haptic feedback may be modified based on the feedback signal generated by the HRNN model 704. The modified haptic feedback may generate touch sensations and thermal sensations, extent of which may depend at least on the values of force and pressure, as predicted by the HAE model 702.

The HAE model 702 and the HRNN model 704 may be optimized using a combination of supervised and unsupervised learning. The supervised loss may be computed between an output (generated by the HAE model 702 or the HRNN model 704) and a ground-truth (i.e., labels included in training data), while the unsupervised loss may be computed based on a reconstruction error between an input and a reconstructed output generated by a decoder (such as the LSTM decoder 702D).

Figure 8:
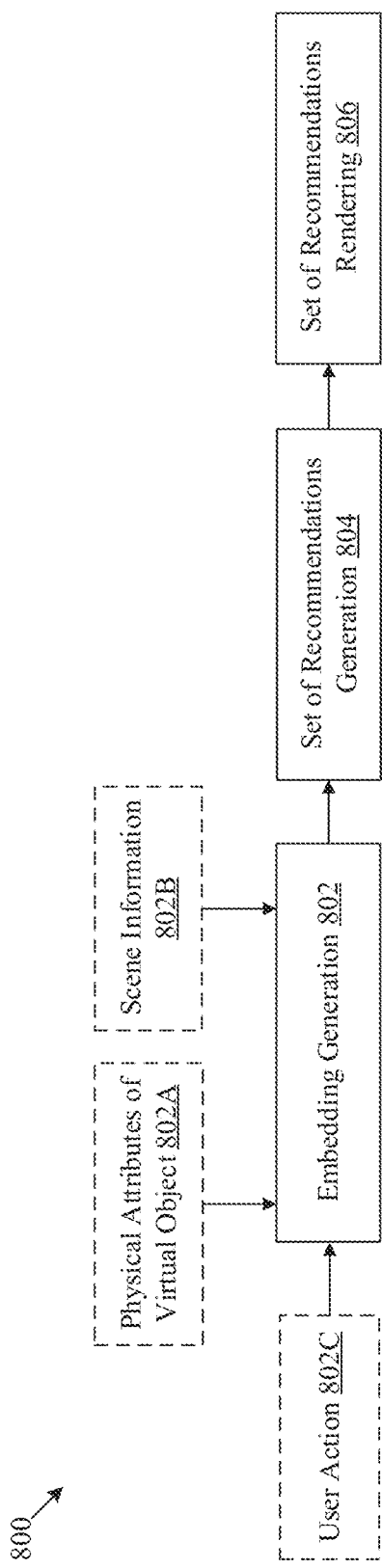
FIG. 8 is a block diagram that illustrates exemplary operations for rendering of a set of recommendations indicative of suggested actions for a digital avatar included in a VR environment, in accordance with an embodiment of the disclosure.

FIG. 8 is a block diagram that illustrates exemplary operations for rendering of a set of recommendations indicative of suggested actions for a digital avatar included in a VR environment, in accordance with an embodiment of the disclosure. FIG. 8 is explained in conjunction with elements from FIG. 1, FIG. 2, FIG. 3, FIG. 4, FIG. 5, FIG. 6, and FIG. 7. With reference to FIG. 8, there is shown an exemplary block diagram 800. The exemplary block diagram 800 may include a sequence of operations that may be executed by the circuitry 202. The sequence of operations may be executed to render a set of recommendations that include actions (or activities) suggested for a digital avatar that may interact with a virtual object in a VR environment. The VR device 104 may render immersive content associated with the VR environment in a VR session. The sequence of operations may start at 802 and may terminate at 806.

At 802, embeddings may be generated. In at least one embodiment, the circuitry 202 may be configured to generate the embeddings based on at least one of physical attributes associated with the virtual object 802A, scene information associated with the VR environment 802B, and a user action 802C (i.e., detected as part of an activity of a digital avatar) in the VR environment. The digital avatar may interact with the virtual object in a duration of the activity.

The circuitry 202 may be configured to determine the physical attributes associated with the virtual object 802A, the scene information associated with the VR environment 802B, and the activity of the digital avatar, based on multiple neural network-based analysis (as described in FIGS. 3-7) of a set of frames of the rendered immersive content. The user action 802C may be determined based on acquisition of information associated with a movement of at least one anatomical portion of the body of a user (for example, the user 112). Based on the determination, the embeddings may be generated. The embeddings may be stored in a state table and may be associated with the digital avatar.

For example, the embeddings may include a first embedding generated based on one or more physical attributes associated with the virtual object 802A, a second embedding generated based on scene information (i.e., content of one or more scenes) associated with the VR environment 802B, a third embedding generated based on engagement of a digital avatar in an activity, a fourth embedding generated based on the user action 802C during the activity, a fifth embedding generated based on the one or more physical attributes associated with the virtual object 802A, the scene information associated with the VR environment 802B, and the user actions, and so on.

At 804, a set of recommendations may be generated based on the embeddings. In at least one embodiment, the circuitry 202 may be configured to generate the set of recommendations based on an application of a recommendation model on the state table that includes the embeddings. The set of recommendations may be generated for the digital avatar. The recommendation model may be a reinforcement learning (RL)-based model and may generate rewards if the set of recommendations are relevant. The relevancy of a recommendation may be determined based on a user input that may include a positive feedback for the recommendation or a detection of acceptance of the recommendation by the user 112.

The set of recommendations may include a set of actions that may be suggested for the digital avatar after the interaction between the digital avatar and the virtual object in the VR environment. Additionally, or alternatively, the set of recommendations may include a first set of observations associated with a first set of changes in the physical attributes of the virtual object 802A for a period in the duration of the VR session, or a second set of observations associated with a second set of changes in the scene information associated with the VR environment 802B for a period in the duration of the VR session. The first set of changes and the second set of changes may be detected in all the frames of the rendered immersive content based on the neural network-based analysis (in near real time) of all the frames of the immersive content.

In accordance with an embodiment, the circuitry 202 may determine a match between the digital avatar and other digital avatars in the VR environment based on a Generative Adversarial Network (GAN)-based profile matching operation. The GAN-based profile matching operation may involve a determination of embeddings that may be similar to or same as the generated embeddings. For such a determination, the circuitry 202 may compare the generated embeddings from the state table with embeddings that may be stored in a database. Based on the comparison, embeddings similar to or same as the generated embeddings may be determined. The determined embeddings may be associated with other digital avatars. Matches between the digital avatar and other digital avatars may be determined based on a similarity between the embeddings (stored in the state table) associated with the digital avatar and the embeddings associated with the other digital avatars. Thereafter, based on the generated embeddings, the circuitry 202 may apply a collaborative filtering operation to determine a set of actions or suggestions associated with the other digital avatars. The other digital avatars may have engaged in the determined set of actions in a similar VR environment in past. For example, if the digital avatar is a batsman and the VR environment is a cricket field, then each of the other digital avatars may be a batsman engaged in an activity (such as a batting activity in which an avatar holds a bat) in the cricket field. The similarity between the embeddings associated with the digital avatar and that of the other digital avatars may be determined based on similarity between physical properties of a ball (i.e., virtual object) with which the digital avatar may interact and physical properties of balls with which the other digital avatars may have had previously interacted. The similarity between the embeddings may be determined further based on conditions of the cricket field (such as a pitch, a weather, or a number of spectators). Based on the similarity, the set of actions such as a shot selection for a particular type of throw of ball may be recommended. The determined set of actions may be outputted as the set of recommendations for the digital avatar. For example, the digital avatar may be recommended to select a shot which may have been previously selected by the other digital avatars.

At 806, the VR device 104 may be controlled to render the generated set of recommendations. In at least one embodiment, the circuitry 202 may control the VR device 104 to render the generated set of recommendations. The circuitry 202 may detect any subsequent interaction between the digital avatar (i.e., batsman) and the virtual object (i.e., ball). If it is determined that a detected interaction corresponds to a recommended action (i.e., the digital avatar played a recommended shot), the recommendation model may be rewarded.

Figure 9:
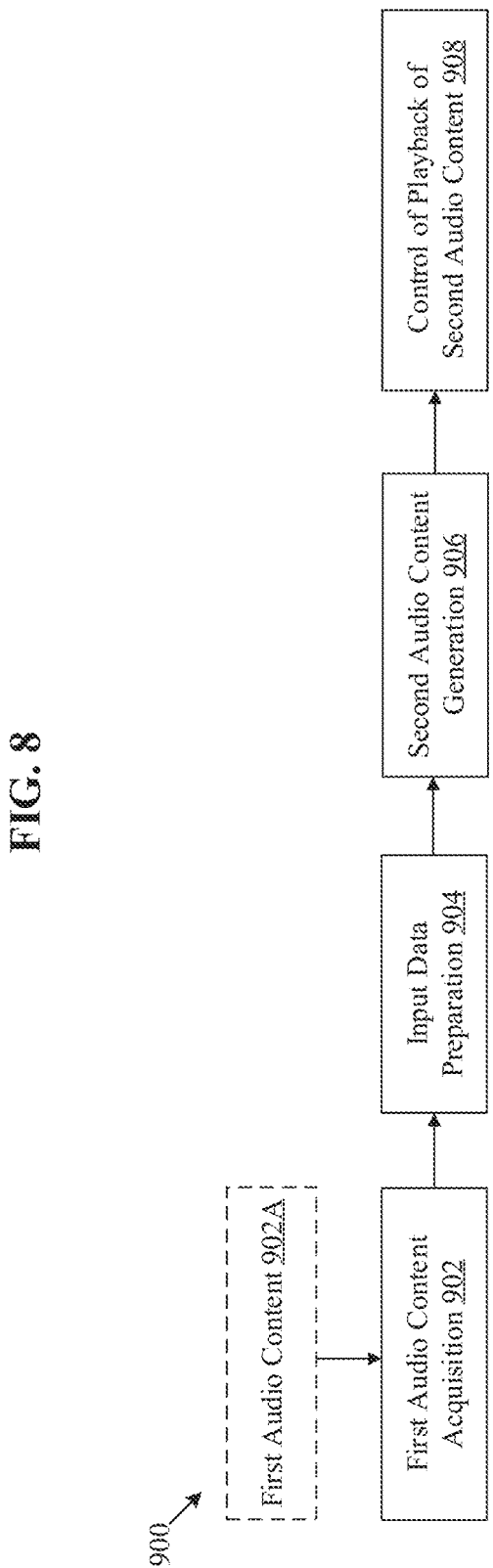
FIG. 9 is a block diagram that illustrates exemplary operations for generation of audio content for playback in a duration of an activity of a digital avatar included in a VR environment, in accordance with an embodiment of the disclosure.

FIG. 9 is a block diagram that illustrates exemplary operations for generation of audio content for playback in a duration of an activity of a digital avatar included in a VR environment, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. With reference to FIG. 9, there is shown an exemplary block diagram 900. The exemplary block diagram 900 may include a sequence of operations that may be executed by the circuitry 202. The sequence of operations may be executed to control playback of audio content in a duration of an activity of a digital avatar. For example, the digital avatar may represent a medical practitioner in a VR environment. The digital avatar may engage in an activity of medical examination (i.e., a physical examination in a metaverse) of a three-dimensional (3D) model of a human heart. During the medical examination (i.e., in a duration of the activity), the audio content may be generated as an audio feedback. The sequence of operations may start at 902 and may terminate at 908.

At 902, a first audio content 902A may be acquired. In at least one embodiment, the circuitry 202 may be configured to acquire the first audio content 902A from a sensor in a real-world environment. For example, the real-world environment may be a room of a clinic where the heart of a human subject is scanned to generate the 3D model of the heart. The first audio content 902A may correspond to a sound of a heartbeat that may captured by the sensor in contact with the heart or positioned close to the heart.

At 904, input data may be prepared based on the first audio content 902A. In at least one embodiment, the circuitry 202 may be configured to prepare the input data based on the first audio content 902A. The input data may be prepared based on reception of the first audio content 902A from the sensor in the real-world environment.

At 906, a second audio content may be generated based on the first audio content 902A. In at least one embodiment, the circuitry 202 may be configured to generate the second audio content for the user (such as the user 112) based on an application of a self-supervised generative adversarial network (SSGAN) on the input data. The SSGAN may include a generator, a shuffler, and a discriminator. The discriminator may be trained to recognize sound of an actual heartbeat. Whereas the generator may be trained to generate a sound based on the prepared input data such that the sound resembles the sound of the actual heartbeat. The sound generated by the generator may be similar to may emulate the sound of the actual heartbeat.

During training, sound generated by the generator may not resemble the sound of the actual heartbeat. The discriminator may receive the initial sound via the shuffler (which may shuffle or sample the initial sound) and may detect that the initial sound does not match the sound of the actual heartbeat. Based on the detection of the discriminator, the circuitry 202 may retrain the generator to generate an updated sound. The discriminator may receive the updated sound via the shuffler and may determine whether the updated sound resembles the sound of the actual heartbeat. If the updated sound resembles the sound of the actual heartbeat, the circuitry 202 may determine that the updated sound (generated by the generator) is the second audio content. Whereas, if the updated sound does not resemble the sound of the actual heartbeat, the generator may be retrained for a number of iterations until the generator is able to finally generate a sound that tricks the discriminator to identify the generated sound as identical to the sound of the actual heartbeat. It should be noted that the discriminator may be "tricked" only if the second audio content is a faithful reproduction of the sound of the actual heartbeat.

At 908, the VR device 104 may be controlled to perform a playback of the second audio content in the duration of the activity. In at least one embodiment, the circuitry 202 may be configured to control the VR device 104 to perform the playback of the second audio content in the duration of the activity. The playback may correspond to an audio feedback that may reveal a state of health of the human heart, for example.

Figure 10:
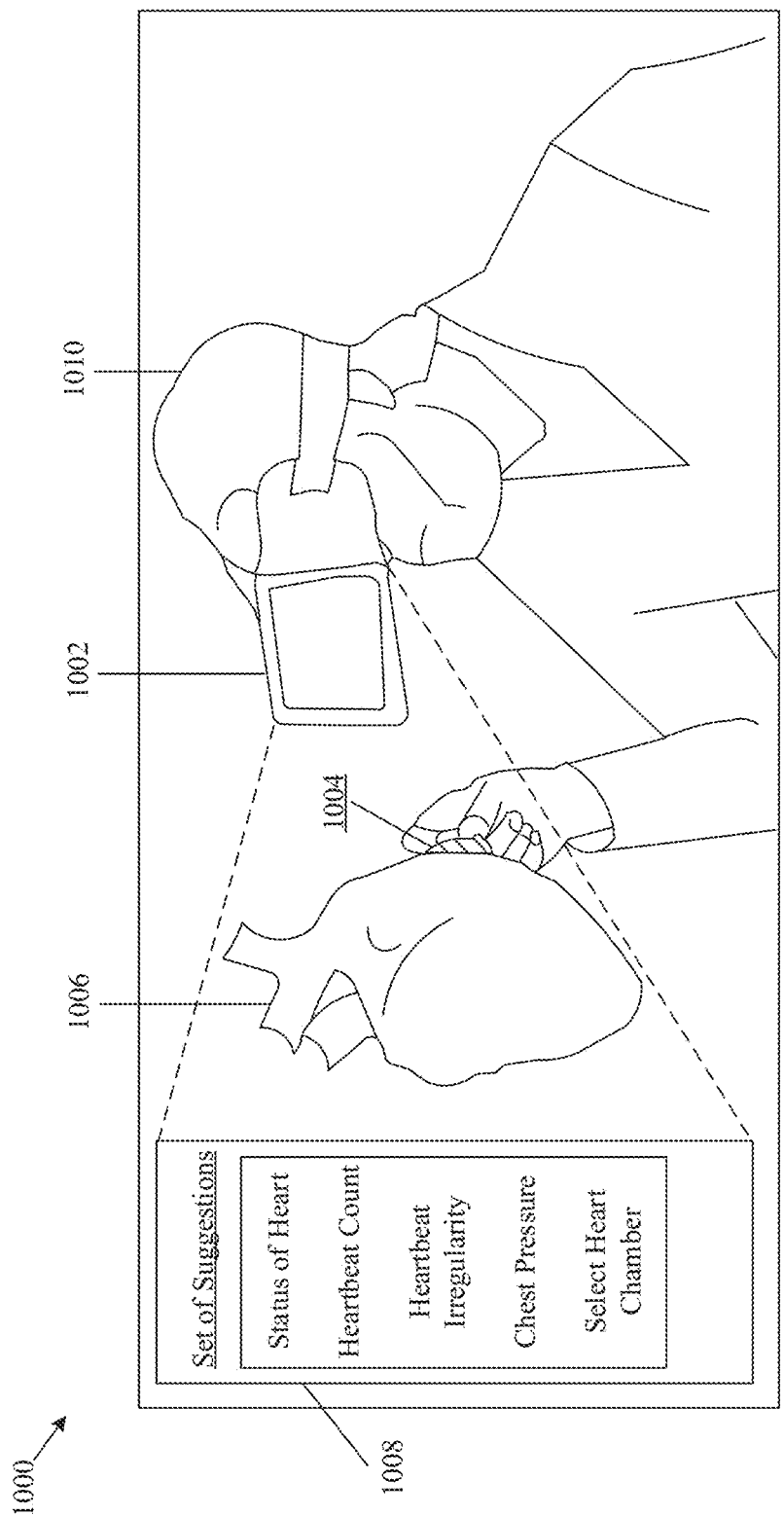
FIG. 10 is a diagram that illustrates an exemplary scenario for rendering of haptic feedback and suggestions based on engagement of a digital avatar in an activity of clinical examination of a three-dimensional (3D) model of a human heart, in accordance with an embodiment of the disclosure.

FIG. 10 is a diagram that illustrates an exemplary scenario for rendering of haptic feedback and suggestions based on engagement of a digital avatar in an activity of clinical examination of a three-dimensional (3D) model of a human heart, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. With reference to FIG. 10, there is shown an exemplary scenario 1000. In the exemplary block diagram 1000, there is shown a VR device 1002 (for example, a head-mounted display), and a haptic device 1004. The circuitry 202 may control the VR device 1002 to render immersive content associated with a VR environment that may include a virtual object 1006 (for example, a 3D model of the heart of a human subject) and a set of suggestions 1008. A user 1010 (for example, a medical practitioner) may wear the VR device 1002 and the haptic device 1004. The rendered immersive content may further include a digital avatar (not shown) of the user 1010 that may interact with the virtual object 1006.

At any time-instant, the circuitry 202 may be configured to acquire the rendered immersive content, extract a set of frames from the rendered immersive content, and perform a neural network-based analysis of the extracted set of frames. Based on the neural network-based analysis, the circuitry 202 may determine physical properties of the virtual object 1006. For example, the determined physical properties of the heart may include one or more of shape, elasticity, weight, roughness, smoothness, fattiness, or permittivity index, of the heart. The circuitry 202 may further determine scene information associated with the VR environment, an activity (for example, medical examination of the heart) of the digital avatar, and an interaction (for example, a contact) between the digital avatar (for example, the hand of the digital avatar) and the virtual object 1006 (i.e., the 3D model of the heart). The circuitry 202 may further detect changes in the physical properties of the virtual object 1006 or the scene information. Based on the determined physical properties of the virtual object 1006, the scene information, and the interaction, the circuitry 202 may generate the set of suggestions 1008. The set of suggestions may include, for example, a status of the heart (such as fatty heart), a heartbeat count per minute, an irregularity in heart rate, a chest pressure, an action to select a heart chamber for medical examination of the heart chamber, and so on. The circuitry 202 may further control the haptic device 1004 to generate a haptic feedback based on a first feedback signal at the moment of the interaction between the digital avatar and the virtual object 1006. The first feedback signal may be generated based on the determined physical properties, the scene information, and the interaction.

During the interaction, the circuitry 202 may detect a movement of a hand of the user 1010. The detection may be based on reception of parameters, such as force and pressure from a sensor that may in contact with the hand or any other anatomical portion of the body of the user 1010. Based on the received parameters, the circuitry 202 may generate a prediction via the HAE model 702. The circuitry 202 may further generate a second feedback signal via the HRNN model 704 based on the prediction, the physical properties, and the scene information. The generated haptic feedback may be modified based on the second feedback signal.

In accordance with an embodiment, the circuitry 202 may control the VR device 1002 to render immersive content associated with a VR environment that includes a 3D model of the lungs of the human subject. The circuitry 202 may determine physical properties of the lungs such as sponginess, texture, lung volume, roughness, thickness, shape, weight, softness, sponginess, elasticity, moisture, and so on. The circuitry 202 may further determine scene information and an interaction (for example, a contact) between the digital avatar and the 3D model of the lungs. Based on the determined physical properties, the scene information, and the interaction, a set of suggestions may be generated. The set of suggestions may include, for example, a lung healthiness index, a lung obstruction level, a texture of the lungs, a sponginess of the lungs, an action to place a stethoscope in an upper part of the chest, around midclavicular line of the chest, or at the bottom of the chest.

In accordance with an embodiment, the circuitry 202 may control the VR device 1002 to render immersive content associated with a VR environment that includes a 3D model of a tooth of the human subject. The circuitry 202 may determine physical properties of the tooth such as tooth shape, smoothness, fixity, toughness, presence of cavity, hardness, elasticity, type (ceramic, silver, or gold) of the tooth, and so on. The circuitry 202 may further determine scene information and an interaction (for example, a contact) between forceps (placed in one of the hands of the digital avatar) and the tooth. Based on the determined physical properties, the scene information, and the interaction, a set of suggestions may be generated. The set of suggestions may include, for example, an indication of a likelihood of breakdown of the tooth, an infection level in the tooth (if any), or an action associated with fixing the tooth.

Figure 11A:
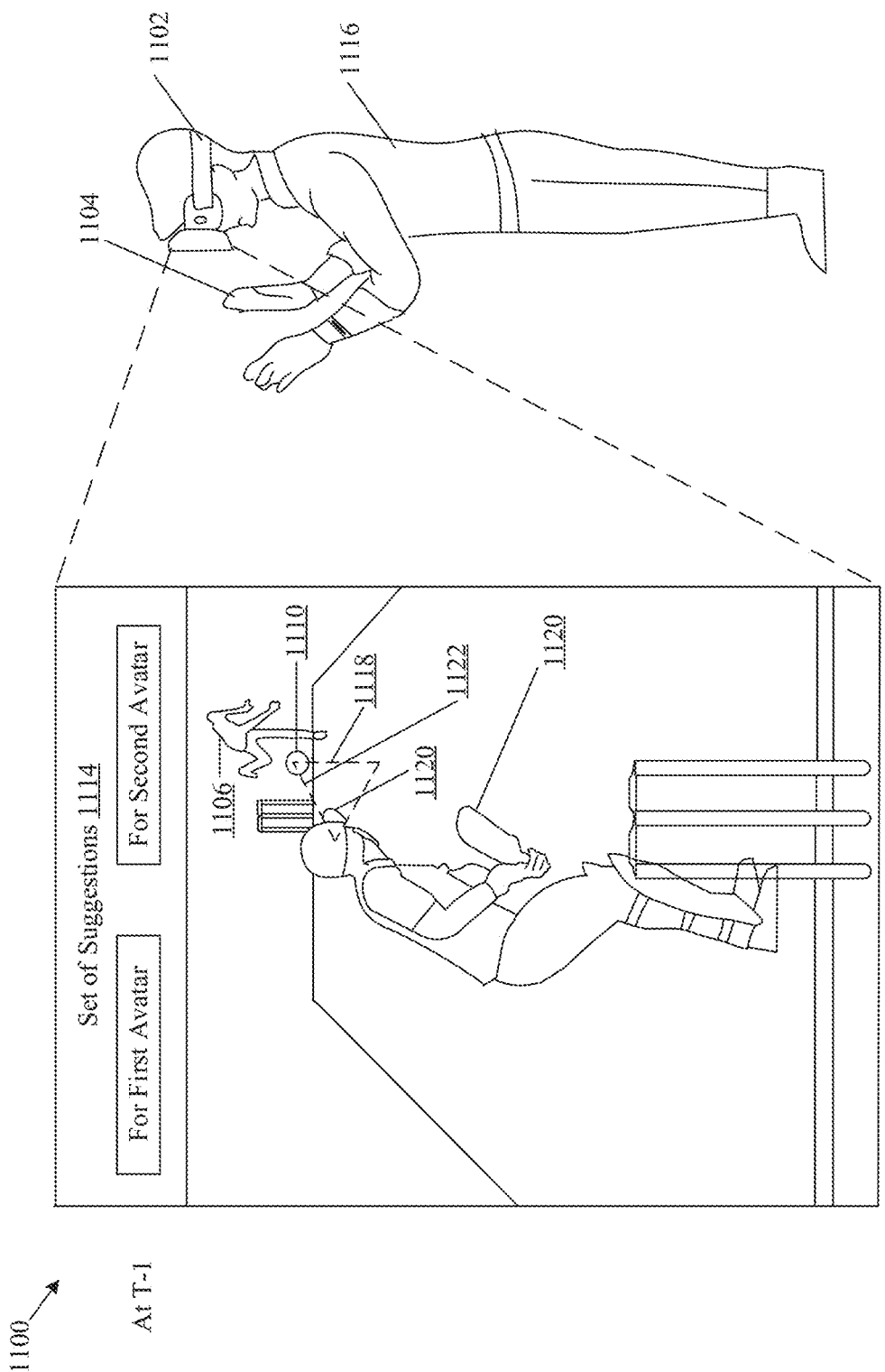
FIGS. 11A and 11B are diagrams that illustrate an exemplary scenario for rendering of a haptic feedback based on an interaction between a digital avatar and a virtual object associated with a VR environment, in accordance with an embodiment of the disclosure.
Figure 11B:
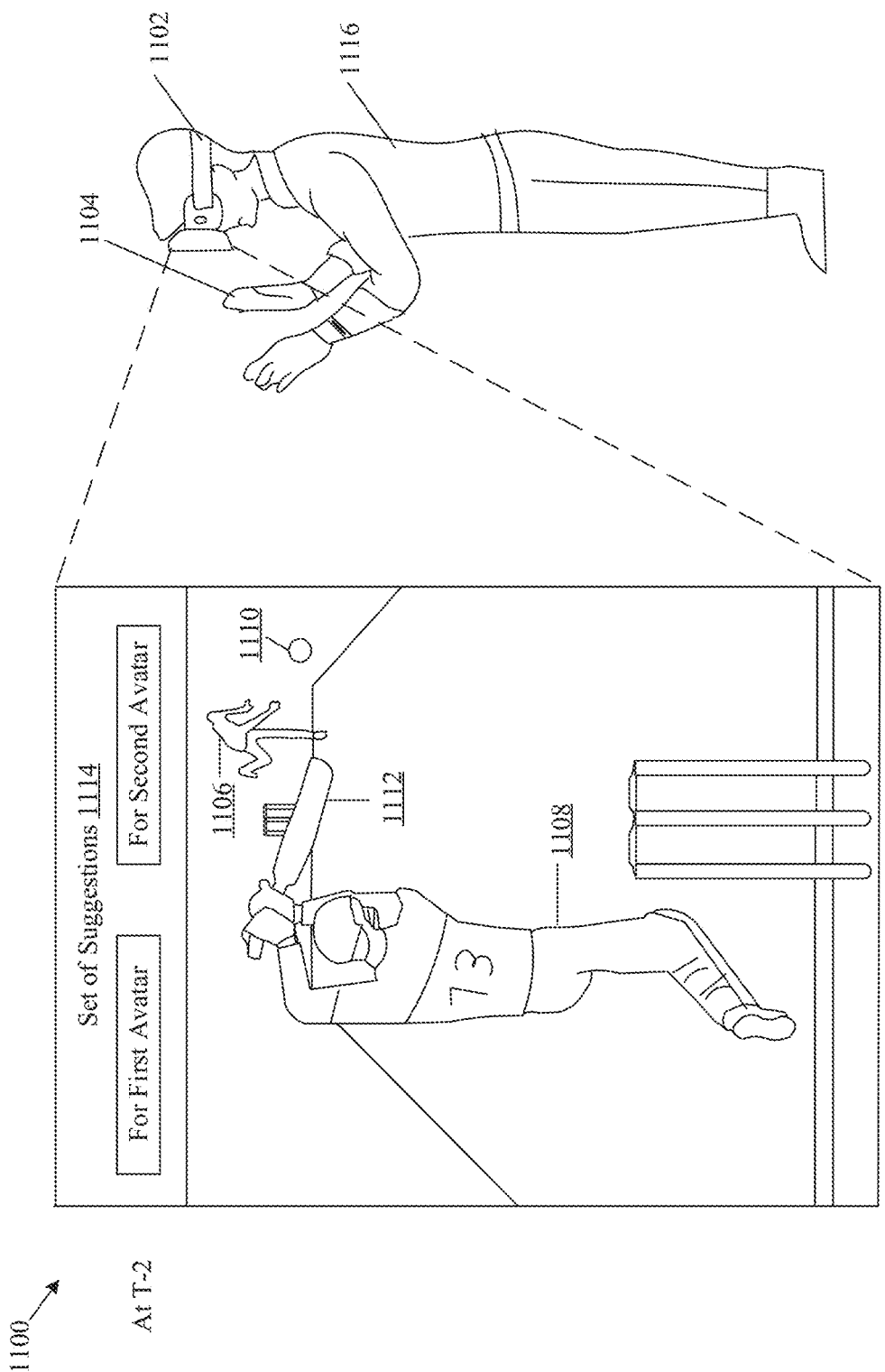

FIGS. 11A and 11B are diagrams that illustrate an exemplary scenario for rendering of a haptic feedback based on an interaction between a digital avatar and a virtual object associated with a VR environment, in accordance with an embodiment of the disclosure. FIGS. 11A and 11B are explained in conjunction with elements from FIG. 1, FIG. 2, FIG. 3, FIG. 4, FIG. 5, FIG. 6, FIG. 7, FIG. 8, FIG. 9, and FIG. 10. With reference to FIGS. 11A and 11B, there is shown an exemplary scenario 1100 at two time-instants T-1 and T-2. In the exemplary block diagram 1100, there is shown a VR device 1102 (for example, a head-mounted display), and a haptic device 1104. The circuitry 202 may control the VR device 1102 to render immersive content associated with a VR environment (for example, a cricket field) that may include a first digital avatar 1106 (for example, a bowler), a second digital avatar 1108 (a batsman), a first virtual object 1110 (for example, a ball), a second virtual object 1112 (for example, a bat), and a set of suggestions 1114. A user 1116 may wear the VR device 1102 and the haptic device 1104.

At time instant T-1, the circuitry 202 may be configured to acquire the rendered immersive content, extract a set of frames from the rendered immersive content, and perform a neural network-based analysis of the extracted set of frames. Based on the neural network-based analysis, the circuitry 202 may determine physical properties of the each of the first virtual object 1110 and the second virtual object 1112. For example, the determined physical properties of the first virtual object 1110 (i.e., the ball) may include one or more of hardness, roughness, smoothness, and so on of the ball. The determined physical properties of the second virtual object 1112 (i.e., the bat) may include a weight of the bat and a state of the roughness of the bat. The circuitry 202 may further determine scene information associated with the VR environment (for example, a ground condition, a pitch condition (e.g., wet, or dry), or a weather (sunny, cloudy, foggy, etc.).

The circuitry 202 may further determine an activity (such as running or throwing the ball) of the of the first digital avatar 1106 (i.e., the bowler), an activity (such as holding the bat) of the second digital avatar 1108 (i.e., the batsman). The circuitry 202 may further detect whether there are any changes in the physical properties of each of the first virtual object 1110 and the second virtual object 1112, and the scene information. Based on the determined physical properties of the first virtual object 1110 and the second virtual object 1112, and the determined scene information, the circuitry 202 may generate the set of suggestions 1114.

In accordance with an embodiment, the circuitry 202 may receive a user input that includes a selection of the first digital avatar 1106 or the second digital avatar 1108 as a representative of the user 112. For example, the user input may include a selection of the second digital avatar 1108. Based on the user input, the circuitry 202 may include add suggestions for the second digital avatar 1108 in the set of suggestions 1114. For example, the suggestions may include a technique to hold or lift the bat (i.e., the second virtual object 1112) a shot to hit, or a force to be applied using the bat to hit the ball. The suggestions may be generated based on speed values and other properties of the ball (i.e., the first virtual object 1110).

In accordance with an embodiment, the suggestions may be provided further based on a virtual height 1118 at which the first virtual object 1110 (i.e., the ball) may be situated (or detected) in the VR environment, an angle 1120 between segments associated with a viewpoint of the second digital avatar 1108 (i.e., the batsman representing the user 1116) and the first virtual object 1110, and a distance 1122 between the first virtual object 1110 and the viewpoint of the second digital avatar 1108. If the virtual height 1118 is represented by "h", the angle 1120 is represented by "a", and the distance 1122 is represented by "d", then the mutual relationship may be represented as: "h=d*tan(a)". The circuitry 202 may train a neural network model (such as an artificial neural network (ANN) model) using computation data associated with a computation of virtual heights at which virtual objects may be detected in a VR environment. Based on such training, the neural network model may predict the distance 1122 between the first virtual object 1110 and the viewpoint of the second digital avatar 1108. In an embodiment, the detection may be based on principles of similarity between different triangles. For example, the viewpoint of the second digital avatar 1108 may act as an apex of one triangle, and a location of the first virtual object 1110 (i.e., coordinates at which the first virtual object 1110 may be detected in the VR environment) may act as an apex of another triangle. The virtual height 1118 and the angle 1120 determined based on a similarity between the triangles may be used for computing the distance 1122.

At time instant T-2, the circuitry 202 may be configured to detect and an interaction between the second digital avatar 1108 and the first virtual object 1110 using the second virtual object 1112 (see FIG. 11B). The circuitry 202 may further control the haptic device 1104 to generate a haptic feedback at the moment of the interaction between the second digital avatar 1108 and the first virtual object 1110. The haptic feedback may be generated based on a feedback signal, which may be generated based on the determined physical properties of each of the first virtual object 1110 and the second virtual object 1112, the scene information, and the interaction between the second digital avatar 1108 and the first virtual object 1110.

If the received user input indicates a selection of the first digital avatar 1106, the circuitry 202 may add suggestions for the first digital avatar 1106 in the set of suggestions 1114. The suggestions may include, for example, a force to be applied while throwing the ball or techniques to swing or turn the ball. The addition of such suggestions may be based on the physical properties of the ball.

In accordance with an embodiment, the circuitry 202 may control the VR device 1102 to render immersive content associated with a VR environment that corresponds to a baseball field. The VR environment may include a third digital avatar (for example, a pitcher), a fourth digital avatar (a batter), a third virtual object (for example, a baseball), a fourth virtual object (for example, a baseball bat), and a set of suggestions. The circuitry 202 may determine physical properties (such as hardness, roughness, or smoothness) of the third virtual object and physical properties (such as weight, length, and roughness) of the fourth virtual object. The circuitry 202 may further determine scene information associated with the VR environment (for example, a ground condition, a pitch condition, or a weather). The circuitry 202 may further determine an activity (such as running or throwing the baseball) of the third digital avatar, an activity (such as holding the baseball bat) of the fourth digital avatar, and an interaction between the fourth digital avatar and the third virtual object. The generation of the set of suggestions may be based on the physical properties of the third virtual object and the fourth virtual object, and the scene information. The suggestions for the third digital avatar may include, for example, techniques to throw or catch the baseball (i.e., the third virtual object) or a force that may be required to be applied while throwing the baseball. The suggestions for the fourth digital avatar may include a technique to hold or lift the baseball bat (i.e., the fourth virtual object), a shot to hit, or a force to be applied using the baseball bat to hit the baseball.

Figure 12:
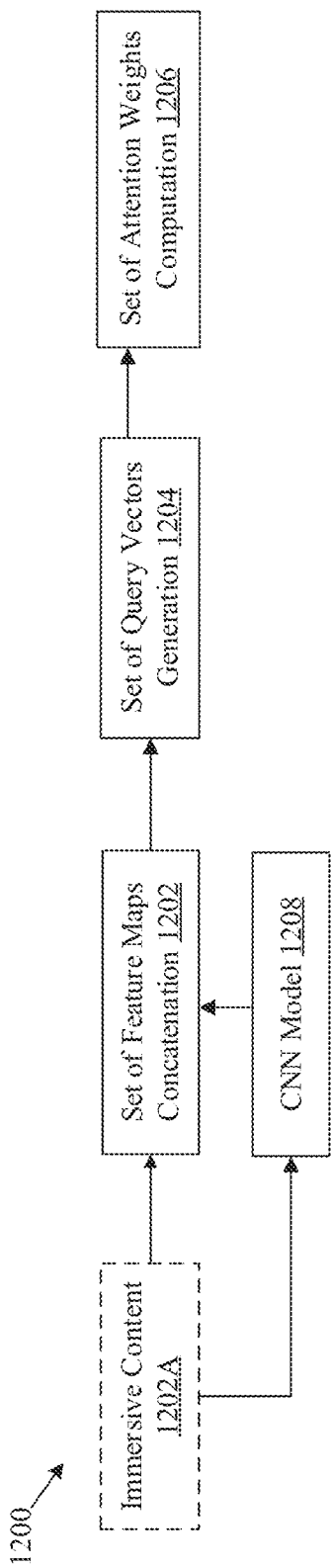
FIG. 12 is a block diagram that illustrates exemplary operations of a multi-convoluted geographical attention network for computation of attention weights for a multi-spatial attention network, in accordance with an embodiment of the disclosure.

FIG. 12 is a block diagram that illustrates exemplary operations of a multi-convoluted geographical attention network for a computation of attention weights for a multi-spatial attention network, in accordance with an embodiment of the disclosure. FIG. 12 is explained in conjunction with elements from FIG. 1, FIG. 2, FIG. 3, FIG. 4, FIG. 5, FIG. 6, FIG. 7, FIG. 8, FIG. 9, FIG. 10, FIG. 11A, and FIG. 11B. With reference to FIG. 12, there is shown an exemplary block diagram 1200. The exemplary block diagram 1200 may include a sequence of operations that may be executed by the circuitry 202. The sequence of operations may be executed using a multi-convoluted geographical attention network for computation of attention weights. The attention weights may be used for detection and tracking of virtual objects associated with a VR environment rendered on the VR device 104. The sequence of operations may start at 1202 and may terminate at 1206.

At 1202, a set of feature maps associated with a set of frames may be concatenated. In at least one embodiment, the circuitry 202 may be configured to concatenate the set of feature maps associated with the set of frames. The set of frames may belong to immersive content 1202A such as metaverse content. The circuitry 202 may detect that a VR session is active on the VR device 104. Based on the detection, the circuitry 202 may acquire the immersive content 1202A, which may be rendered in the active VR session. From the acquired immersive content 1202A, the set of frames (for example, "$x_1 \ldots x_N$") may be extracted.

For example, a first frame (i.e., $x_1$) may be extracted at a time instant 't', a second frame (i.e., $x_2$) may be extracted at a time instant 't+1', and third frame (i.e., $x_3$) may be extracted at a time instant 't+2'.

The circuitry 202 may be further configured to generate the set of feature maps (for example, "$f_1 \ldots f_N$") as an output based on an application of a CNN model 1208 on the set of frames "$x_1 \ldots x_N$". The set of feature maps may be associated with virtual objects included in the set of frames. For example, a first feature map (i.e., $f_1$) may be generated based on an application of the CNN model 1208 on the first frame (i.e., $x_1$). Similarly, a second feature map (i.e., $f_2$) and a third feature map (i.e., $f_3$) may be generated based on an application of the CNN model 1208 on the second frame (i.e., $x_2$) and third frame (i.e., $x_3$), respectively. The CNN 1208 may include an input layer (such as a convolution layer), one or more intermediate layers, one or more pooling layers (for example, a max pooling layer and an average pooling layer), and a fully connected network. The set of features "$f_1 \ldots f_N$" may be concatenated for generation of a concatenated feature map. For example, the set of feature maps may include the feature maps $f_1$, $f_2$, and $f_3$. The circuitry 202 may, thus, concatenate the feature $f_1$, $f_2$, and $f_3$ to generate a concatenated feature map. In some embodiments, the set of feature maps may be generated in parallel based on simultaneous application of the multiple CNNs (such as the CNN 1208) on the set of frames.

At 1204, a set of query vectors may be generated based on the concatenated feature map. In at least one embodiment, the circuitry 202 may be configured to generate the set of query vectors based on the concatenated feature map. The generation may include an application of a query vector generation (QVG) function on the concatenated feature map. The concatenated feature map may represent an independent variable of the QVG function. Based on such an application, the set of query vectors, including a first subset of query vectors and a second subset of query vectors may be generated. Each query vector of the first subset of query vectors may be generated for each foreground object that may be detected in the set of frames. Similarly, each query vector of the second subset of query vectors may be generated for each background object that may be detected in the set of frames.

At 1206, a set of attention weights may be computed for each query vector of the set query vectors. In at least one embodiment, the circuitry 202 may be configured to compute the set of attention weights for each query vector (associated with each foreground or background virtual object) of the generated set of query vectors. The computation of the set of attention weights for the corresponding query vector may be based on features of a virtual object included in a feature map of the set of feature maps and a query vector of the set of query vectors generated for the virtual object. Each set of attention weights may correspond to a different region of a frame of the set of frames in which the virtual object may be detected.

In accordance with an embodiment, the set of attention weights may be computed based on an evaluation of a dot product between the query vector and a learned set of parameters that may represent an importance of each feature map of the set of feature maps. The set of attention weights may be used to weigh each geographical location in the concatenated feature map. The weighing may lead to generation of a set of spatially-attentive feature maps. Each spatially-attentive feature map may have a unique set of weights that may highlight a relevant region in the concatenated feature map. The spatially-attentive feature maps may be used by a LSTM network (such as the LSTM network 306) for prediction of "0" associated with a DQN agent model (such as the DQN agent model 302), based on the set of query vectors. The DQN agent model 302 may be retrained based on a predicted value of "0" to detect and track virtual objects.

Figure 13:
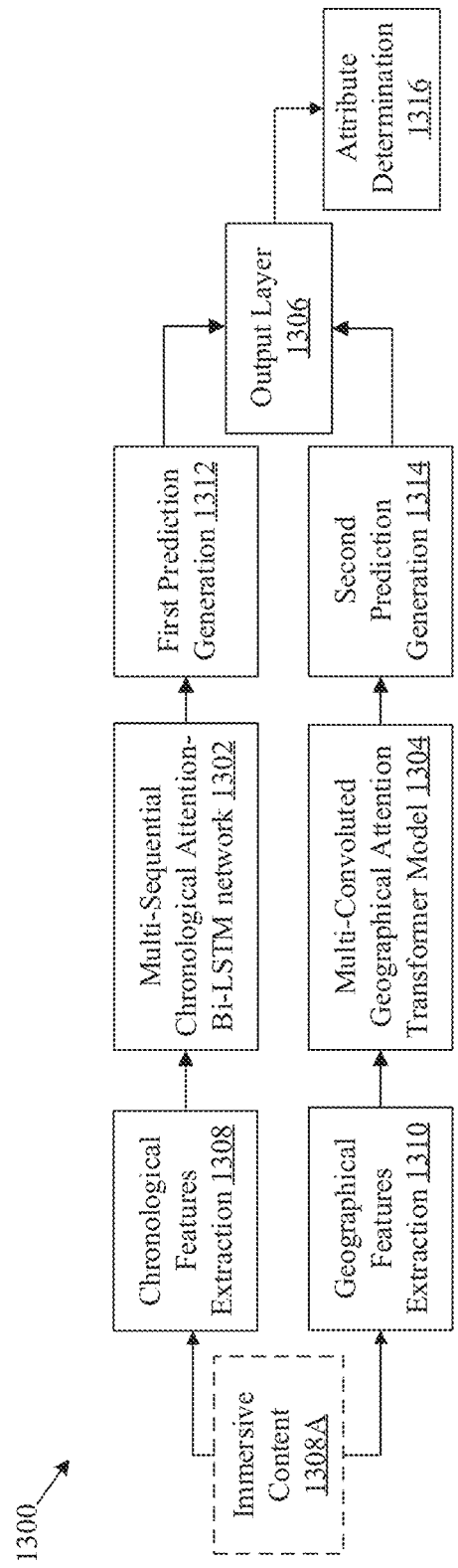
FIG. 13 is a block diagram that illustrates exemplary operations for determination of attributes of a virtual object detected in a VR environment, in accordance with an embodiment of the disclosure.

FIG. 13 is a block diagram that illustrates exemplary operations for determination of attributes of a virtual object detected in a VR environment, in accordance with an embodiment of the disclosure. FIG. 13 is explained in conjunction with elements from FIG. 1, FIG. 2, FIG. 3, FIG. 4, FIG. 5, FIG. 6, FIG. 7, FIG. 8, FIG. 9, FIG. 10, FIG. 11A, FIG. 11B, and FIG. 12. With reference to FIG. 13, there is shown an exemplary block diagram 1300. The exemplary block diagram 1300 may include a sequence of operations that may be executed by the circuitry 202 by use of a multi-sequential chronological attention-Bi-LSTM network 1302, a multi-convoluted geographical attention transformer model 1304, and an output layer 1306. The sequence of operations may be executed for determination of attributes of each virtual object of a set of virtual objects that may be included in a VR environment. The VR device 104 may render immersive content 1308A associated with the VR environment in a VR session. The sequence of operations may start at 1308 and may terminate at 1316.

At 1308, chronological features (or attributes) associated with each virtual object of the set of virtual objects may be extracted. In at least one embodiment, the circuitry 202 may be configured to extract chronological features associated with each virtual object of the set of virtual objects, which may be detected in a set of frames of immersive content 1308A. The circuitry 202 may acquire the set of frames from the immersive content 1308A and thereafter, detect the set of virtual objects in the set of frames. The chronological features or attributes may be extracted based on a result of detection of the virtual object in the set of frames. The chronological features may be extracted to capture any time related dependencies (such as decay properties of a virtual object, changes in roughness, smoothness, or other factors of the virtual object) of attributes of the virtual object that may be detected in the virtual object.

At 1310, geographical features (or attributes) associated with each virtual object of the set of virtual objects may be extracted. In at least one embodiment, the circuitry 202 may be configured to extract the geographical features associated with each virtual object of the set of virtual objects (which may be detected in the set of frames of immersive content 1308A). Each frame of the set of frames may be analyzed for detection of the geographical features. The geographical features may be extracted based on the result of detection of the set of the virtual objects in the set of frames.

At 1312, a first prediction may be generated. In at least one embodiment, the circuitry 202 may be configured to generate the first prediction based on an application of the multi-sequential chronological attention-Bi-LSTM network 1302 on the extracted chronological features. The multi-sequential chronological attention-Bi-LSTM network 1302 may include a multi-sequential chronological attention-based CNN model and a Bi-LSTM model. For the generation of the prediction, initially, a set of feature maps associated with the set of the virtual objects (detected in the set of frames of immersive content 1308A) may be generated. For example, a first feature map may be generated based on an application of the multi-sequential chronological attention-based CNN model on an object detection result associated with detection of a first virtual object of the set of virtual objects. The multi-sequential chronological attention-based CNN model may include an input layer, (such as a convolution layer), intermediate layers, one or more pooling layers (such as max pooling layers and average pooling layers), and a set of sequential layers. Similarly, other feature maps may be generated based on applications of the multi-sequential chronological attention-based CNN model on object detection results associated with a detection of other virtual objects of the set of virtual objects. The set of features may be concatenated for generation of a concatenated feature map. For example, the set of feature maps may include three feature maps associated with three virtual objects of the set of virtual objects. The circuitry 202 may, thus, concatenate the three feature maps to generate a concatenated feature map.

In at least one embodiment, the circuitry 202 may be configured to generate a set of query vectors based on the concatenated feature map by applying a QVG function on the concatenated feature map. The concatenated feature map may be representative of an independent variable of the QVG function. Each query vector may be associated with a virtual object of the set of virtual objects. A set of attention weights may be computed for each query vector of the set query vectors associated with each virtual object of the set of virtual objects. The computation may be based on features of a corresponding virtual object of the set of virtual objects and a query vector of the set of query vectors generated for the corresponding virtual object. Each attention weight of the set of attention weights may correspond to a region or feature of the input object detection data. In accordance with an embodiment, the set of attention weights may be computed based on evaluation of a dot product between the query vector and a learned set of parameters that may represent an importance of each feature map of the set of feature maps. The set of attention weights may allow generation of a set of spatially-attentive feature maps. Each spatially-attentive feature map may have a unique set of weights that may highlight a relevant region in the concatenated feature map. The spatially-attentive feature maps may be used by the Bi-LSTM model for the generation of the first prediction that may indicate a set of properties or attributes that may be associated with each virtual object of the set of virtual objects.

At 1314, a second prediction may be generated. In at least one embodiment, the circuitry 202 may be configured to generate the second prediction based on a ranking of the extracted geographical features associated with each virtual object of the set of virtual objects, determination of important geographical features from the extracted geographical features, and application of the multi-convoluted geographical attention transformer model 1304 on geographical features (determined as important). For ranking of the extracted geographical features, the circuitry 202 may perform a pairwise correlation analysis and clustering analysis on the geographical features. Thus, for each extracted geographical feature, a correlation may be determined between the corresponding geographical feature and other geographical features. The clustering analysis may involve creation of geographical feature clusters that may include correlating geographical features. After the correlation and clustering analysis, a permutation analysis may be performed to assess ability of each geographical feature cluster to discriminate between different groups or classes of object properties included in a dataset. The permutation analysis may involve randomly permuting group labels included in the dataset (that includes object properties) for a predefined number of times, and recalculating clustering and discriminative power of each cluster for each permutation. For example, the predefined number may be selected as 100 or 1000.

For each geographical feature cluster, an average discriminative power across all permutations may be computed. Further, the geographical feature clusters may be ranked based on the average discriminative power of the geographical feature clusters and geographical features included in the top-ranked geographical feature clusters may be determined as geographical features of importance. The permutation analysis may be repeated for a predefined number of times (for example 5-10 times) to determine whether the extracted geographical features include other geographical features that may be important and to exclude one or more geographical features that have been mistakenly identified as important. The repetition of the permutation analysis may help to obtain a robust and stable ranking of the geographical object features. The outcomes of multiple permutation analyses may be combined to determine the important geographical features. The second prediction may be generated based on the application of the multi-convoluted geographical attention transformer model 1304 on the important geographical features associated with the set of objects. The second prediction may indicate a set of properties or attributes that may be associated with each virtual object of the set of virtual objects.

At 1316, attributes of each virtual object of the set of virtual objects may be determined based on the first prediction and the second prediction. In at least one embodiment, the circuitry 202 may be configured to determine the attributes of each virtual object of the set of virtual objects based on an application of the output layer 1306 on the first prediction and the second prediction. Each of the first prediction and the second prediction may be assigned a weight (i.e., weights of the output layer may be set) for weighing each of the first prediction and the second prediction in the determination of each attribute of a set of attributes. For example, a first weight may be assigned to the first prediction and a second weight may be assigned to the second prediction. The values of each of the first weight and the second weight may be based on application of each of the multi-sequential chronological attention network Bi-LSTM model 1302 and the multi-convoluted geographical attention transformer model 1304 on a validation dataset. The sum of the first weight and the second weight may be "1".

The circuitry 202 may be configured to generate a final prediction based on the application of the output layer 1306 on the first prediction and the second prediction (i.e., the weighted first prediction and the weighted second prediction), and may evaluate a performance of the final prediction on a validation dataset. The performance may be evaluated based on metrics such as mean squared error (MSE). The MSE may be indicative of an accuracy of the final prediction. The value of the first weight and the second weight may be adjusted to improve the performance of the final prediction. Based on the final prediction (which may be associated with each attribute), the circuitry 202 may determine whether a corresponding attribute is present in each virtual object of the set of virtual objects. The final prediction may indicate a change in the attributes of the virtual object, a change in shape of the virtual object, and/or a change in portion/area of the virtual object that may be in contact with a digital avatar throughout a duration of the immersive content 1308A.

Figure 14:
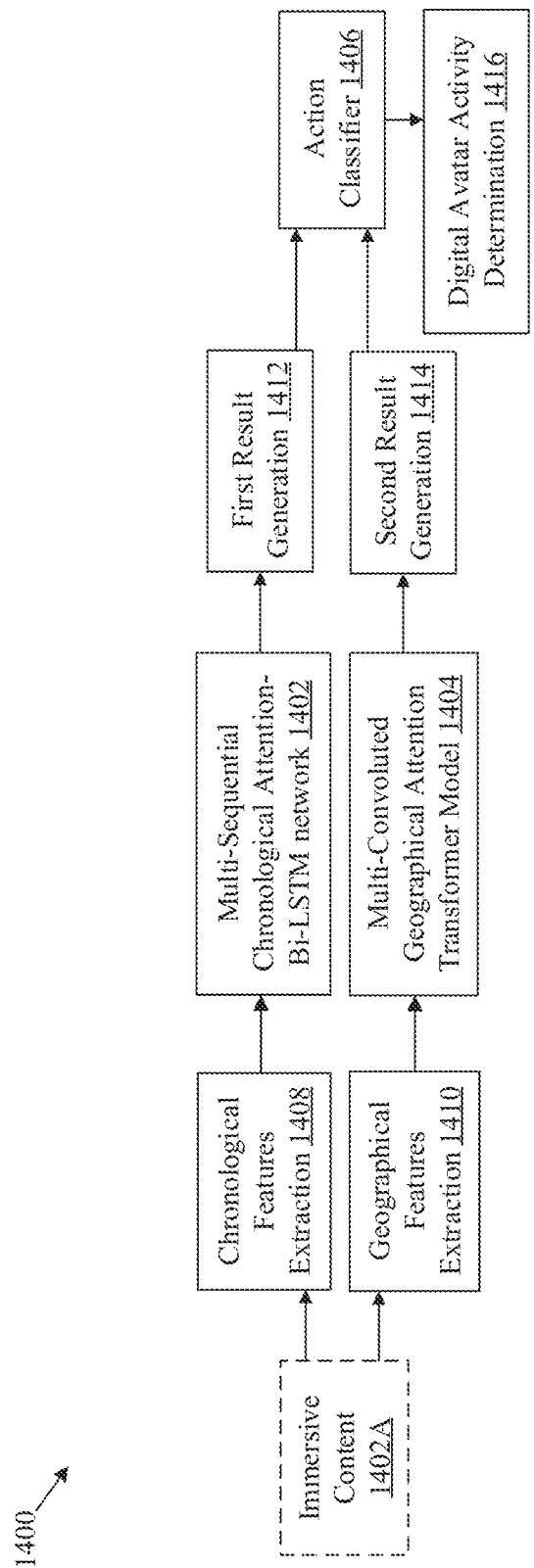
FIG. 14 is a block diagram that illustrates exemplary operations for determination of an activity of a digital avatar associated with a VR environment, in accordance with an embodiment of the disclosure.

FIG. 14 is a block diagram that illustrates exemplary operations for determination of an activity of a digital avatar associated with a VR environment, in accordance with an embodiment of the disclosure. FIG. 14 is explained in conjunction with elements from FIG. 1, FIG. 2, FIG. 3, FIG. 4, FIG. 5, FIG. 6, FIG. 7, FIG. 8, FIG. 9, FIG. 10, FIG. 11A, FIG. 11B, FIG. 12, and FIG. 13. With reference to FIG. 14, there is shown an exemplary block diagram 1400. The exemplary block diagram 1400 may include a sequence of operations that may be executed by the circuitry 202 by use of a multi-sequential chronological attention-Bi-LSTM network 1402, a multi-convoluted geographical attention transformer model 1404, and an action classifier 1406.

The sequence of operations may be executed to determine an activity in which a digital avatar (included in a VR environment) may be engaged. The VR device 104 may render immersive content 1402A associated with the VR environment during an active VR session. A set of frames of the immersive content 1402A may be extracted. The sequence of operations may start at 1408 and may terminate at 1416.

At 1408, chronological features associated with the set of frames may be extracted. In at least one embodiment, the circuitry 202 may be configured to extract chronological features associated with a frame of the set of frames. For the extraction of the chronological features, the circuitry 202 may detect the digital avatar and a set of virtual objects in the set of frames. Based on results of the detection, an activity of the digital avatar may be detected. The activity may involve association of the detected digital avatar with a detected virtual object of the set of virtual objects and an interaction between the detected digital avatar and the detected one or more virtual objects. The extracted chronological features or attributes associated with the set of frames may be based on the results of detection of the digital avatar and the set of virtual objects in the set of frames.

At 1410, geographical features associated with the set of frames may be extracted. In at least one embodiment, the circuitry 202 may be configured to extract the geographical features associated with the set of frames. The geographical features or attributes associated with the set of frames may be extracted based on the results of detection of the digital avatar and the set of virtual objects in the set of frames.

At 1412, a first result may be generated for each frame of the extracted set of frames based on application of the multi-sequential chronological attention-Bi-LSTM network 1402 on the extract chronological features associated with frame of the set of frames. The multi-sequential chronological attention-Bi-LSTM network 1402 may include a multi-sequential chronological attention-based CNN model and a Bi-LSTM model. In at least one embodiment, the circuitry 202 may be configured to generate the first result based on the application of the multi-sequential chronological attention-based CNN model on the extracted chronological features. The chronological feature may be extracted for capturing of time related dependencies from context data. Also, the multi-sequential chronological attention-Bi-LSTM network 1402 may recognize an activity (in one or more frames of the set of frames) or engagement of the detected digital avatar based on the chronological features. The recognized activity may be included in the first result.

In accordance with an embodiment, the multi-sequential chronological attention-based CNN model may generate a prediction, corresponding to a feature map, for each frame of the set of frames. Thus, a set of feature maps may be generated for the set of frames. Each feature map may be indicative of chronological features extracted from a frame of the set of frames for which the corresponding feature is predicted. The circuitry 202 may concatenate the feature maps of the set of feature maps for a generation of a concatenated feature map. Thereafter, a set of query vectors may be computed based on the concatenated feature map using a QVG function. An outcome returned by the QVG function may be used for a computation of a set of attention weights for each query vector of the set of query vectors. The computation of the set of attention weights for the corresponding query vector may be based on chronological features of a frame for which the corresponding query vector is generated and the corresponding query vector. The set of attention weights may allow generation of a set of spatially-attentive feature maps. Each spatially-attentive feature map may include a unique set of weights that may highlight a relevant region in the concatenated feature map. The spatially-attentive feature maps may be used by the Bi-LSTM model of the multi-sequential chronological attention-Bi-LSTM network 1402 for the generation of the first result. The first result may indicate an activity in which the digital avatar may be engaged (as depicted in the set of frames of the immersive content 1402A).

At 1414, a second result may be generated for each frame of the extracted set of frames. In at least one embodiment, the circuitry 202 may be configured to generate the second result for each frame of the extracted set of frames based on a ranking of the extracted geographical features associated with the corresponding frame, determination of important geographical features based on the ranking, and an application of the multi-convoluted geographical attention transformer model 1404 on the geographical features determined as important. The multi-convoluted geographical attention transformer model 1404 may recognize an activity (in one or more frames of the set of frames) of engagement of the detected digital avatar based on the important geographical features. The recognized activity may be included in the second result.

For ranking of the extracted geographical features, the circuitry 202 may perform a pairwise correlation analysis and clustering analysis of the geographical features associated with the set of frames. Based on the correlation analysis, similar geographical features in each frame of the set of frames may be identified and a set of geographical feature clusters for a corresponding frame may be created. Thereafter, a permutation analysis may be performed to assess an ability of each geographical feature cluster to discriminate between different groups or classes of geographical features included in a dataset of geographical features. The permutation analysis may involve randomly permuting group labels included in the dataset for a predefined number of times, and recalculating clustering and discriminative power of each geographical feature cluster for each permutation. For each geographical feature cluster, an average discriminative power across all permutations may be computed. Thereafter, the geographical feature clusters ranked based on the computed average discriminative power of the individual geographical feature clusters. The geographical features included in the top-ranked clusters may be determined as important geographical features associated with the set of frames. The permutation analysis may be repeated for a predefined number of times to ensure that all important geographical features associated with the set of frames may be identified and geographical features that may be mistakenly identified as important in previous permutation analyses are excluded. The outcomes of multiple permutation analyses may be combined to determine the important geographical features associated with the set of frames. The second result may be generated based on the application of the multi-convoluted geographical attention transformer model 1404 on the important geographical features. The second result may indicate an activity in which the digital avatar may be engaged (as depicted in the set of frames of the immersive content 1402A).

At 1416, an activity in which the digital avatar may be engaged in the duration of the active VR session may be determined. In at least one embodiment, the circuitry 202 may be configured to determine the activity based on the first result and the second result. The circuitry 202 may apply the action classifier 1406 on the generated first result and the generated second result to obtain a label, as an output of the action classifier 1406, that may indicate the activity that the digital avatar may be engaged. The generated label may be associated with a set of scores for the set of activities. Each score may indicate a likelihood of the digital avatar being engaged in a specific activity. For example, the score may be between "0" and "1". For a sports activity, a score of "1" may indicate a 100% confidence that the digital avatar is engaged in the sports activity.

Figure 15:
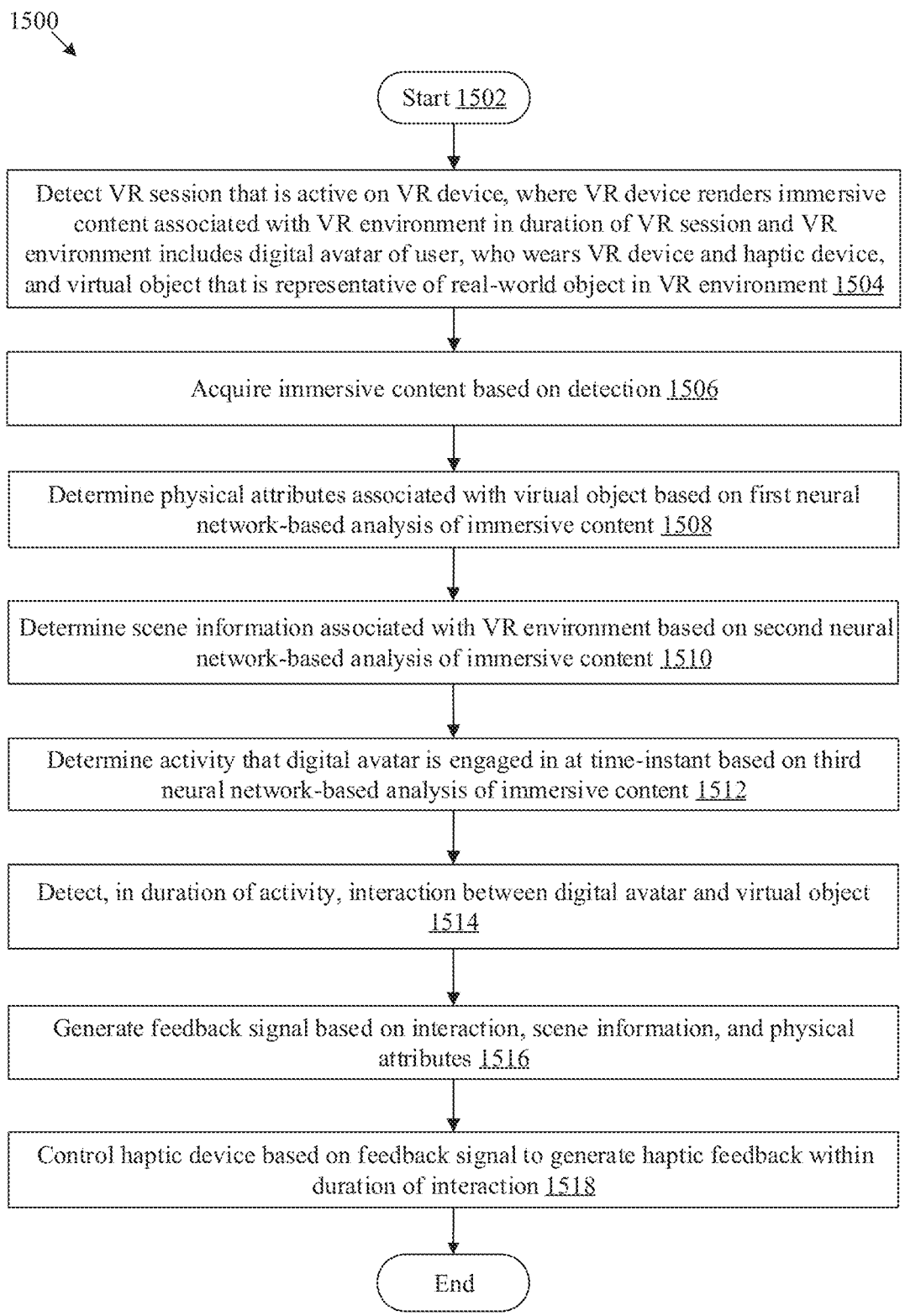
FIG. 15 is a flowchart that illustrates operations for an exemplary method for rendering of AI-based haptic feedback with recommendations in a VR environment, in accordance with an embodiment of the disclosure.

FIG. 15 is a flowchart that illustrates operations for an exemplary method for rendering of AI-based haptic feedback with recommendations in a VR environment, in accordance with an embodiment of the disclosure. FIG. 15 is explained in conjunction with elements from FIG. 1, FIG. 2, FIG. 3, FIG. 4, FIG. 5, FIG. 6, FIG. 7, FIG. 8, FIG. 9, FIG. 10, FIG. 11A, FIG. 11B, FIG. 12, FIG. 13, and FIG. 14. With reference to FIG. there is shown a flowchart 1500. The operations from 1502 to 1518 may be implemented by any computing system, such as, by the system 102, or the circuitry 202 of the system 102, of FIG. 1. The operations may start at 1502 and may proceed to 1504.

At 1504, an active VR session may be detected on the VR device 104 that may render an immersive content associated with a VR environment in a duration of the active VR session. In at least one embodiment, the circuitry 202 may be configured to detect the VR session that may be active on the VR device 104. The VR device 104 may render the immersive content associated with the VR environment in the duration of the VR session. The VR environment may include a digital avatar of a user who may wear the VR device 104 and the haptic device 106. The VR environment may further include a virtual object that may be representative of a real-world object in the VR environment. The details of detection of the active VR session, is described, for example, in FIG. 1.

At 1506, the immersive content may be acquired based on the detection. In at least one embodiment, the circuitry 202 may be configured to acquire the immersive content based on the detection. The details of acquisition of the immersive content, is described, for example, in FIG. 1.

At 1508, physical attributes associated with the virtual object may be determined based on a first neural network-based analysis of the immersive content. In at least one embodiment, the circuitry 202 may be configured to determine the physical attributes associated with the virtual object based on the first neural network-based analysis of the immersive content. The details of determination of the physical attributes associated with the virtual object, is described, for example, in FIG. 1 and FIG. 4.

At 1510, scene information associated with the VR environment may be determined based on a second neural network-based analysis of the immersive content. In at least one embodiment, the circuitry 202 may be configured to determine the scene information associated with the VR environment based on the second neural network-based analysis of the immersive content. The details of determination of the scene information, are described, for example, in FIG. 1 and FIG. 5.

At 1512, an activity, that the digital avatar may be engaged in at a time-instant, may be determined based on a third neural network-based analysis of the immersive content. In at least one embodiment, the circuitry 202 may be configured to determine the activity that the digital avatar may be engaged in at the time-instant based on the third neural network-based analysis of the immersive content. The details of determination of the activity, are described, for example, FIG. 1 and FIG. 6.

At 1514, an interaction between the digital avatar and the virtual object may be detected in a duration of the activity. In at least one embodiment, the circuitry 202 may be configured to detect, in the duration of the activity, the interaction between the digital avatar and the virtual object. The details of detection of the interaction, are described, for example, in FIG. 1 and FIG. 7.

At 1516, a feedback signal may be generated based on the interaction, the scene information, and the physical attributes. In at least one embodiment, the circuitry 202 may be configured to generate the feedback signal based on the interaction, the scene information, and the physical attributes. The details of generation of the feedback signal, are described, for example, in FIG. 1 and FIG. 7.

At 1518, the haptic device 106 may be controlled based on the feedback signal to generate a haptic feedback within a duration of the interaction. In at least one embodiment, the circuitry 202 may be configured to control the haptic device 106 based on the feedback signal to generate the haptic feedback within the duration of the interaction. The details of controlling of the haptic device 106 for the generation of the feedback signal, are described, for example, in FIG. 1. Control may pass to the end.

Although the flowchart 1500 is illustrated as discrete operations, such as 1504, 1506, 1508, 1510, 1512, 1514, 1516, and 1518, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (such as the system 102). The computer-executable instructions may cause the machine and/or computer to perform operations that include detection of a VR session that may be active on a VR device (such as the VR device 104). The VR device 104 may render immersive content associated with a VR environment in a duration of the VR session. The VR environment may include a digital avatar of a user, who may wear the VR device 104 and a haptic device 106, and a virtual object that may be representative of a real-world object in the VR environment. The operations may further include an acquisition of the rendered immersive content based on the detection. The operations may further include determination of physical attributes associated with the virtual object based on a first neural network-based analysis of the immersive content. The operations may further include determination of scene information associated with the VR environment based on a second neural network-based analysis of the immersive content. The operations may further include determination of an activity that the digital avatar may be engaged in at a time-instant based on a third neural network-based analysis of the immersive content. The operations may further include detection, in a duration of the activity, an interaction between the digital avatar and the virtual object. The operations may further include generation of a feedback signal based on the interaction, the scene information, and the physical attributes. The operations may further include controlling of the haptic device 106 based on the feedback signal for generation of a haptic feedback within a duration of the interaction.

Exemplary aspects of the disclosure may include a system (such as the system 102 of FIG. 1) that may include circuitry (such as the circuitry 202). The system 102 may further include a VR device (such as the VR device 104) and a haptic device (such as the haptic device 106). The system 102 may be configured to control the VR device 104 and the haptic device 106. The circuitry 202 may be configured to detect a VR session that may be active on the VR device 104. The VR device 104 may render immersive content associated with a VR environment in a duration of the VR session. The VR environment may include a digital avatar of a user, who may wear the VR device 104 and the haptic device 106, and a virtual object that may be a representative of a real-world object in the VR environment. The circuitry 202 may be further configured to acquire the immersive content based on the detection. The circuitry 202 may be further configured to determine physical attributes associated with the virtual object based on a first neural network-based analysis of the immersive content. The circuitry 202 may be further configured to determine scene information associated with the VR environment based on a second neural network-based analysis of the immersive content. The circuitry 202 may be further configured to determine an activity that the digital avatar may be engaged in at a time-instant based on a third neural network-based analysis of the immersive content. The circuitry 202 may be further configured to detect, in a duration of the activity, an interaction between the digital avatar and the virtual object. The circuitry 202 may be further configured to generate a feedback signal based on the interaction, the scene information, and the physical attributes. The circuitry 202 may be further configured to control the haptic device 106 based on the feedback signal to generate a haptic feedback within a duration of the interaction. The haptic feedback includes at least one of a kinesthetic feedback, a tactile feedback, or a thermal feedback.

In accordance with an embodiment, the circuitry 202 may be further configured to detect the virtual object in the VR environment throughout the duration of the VR session. The virtual object may be detected by execution of a visual tracking operation that may use a DQN agent model to process frames of the immersive content and to output one or more predictions to locate the virtual object for at least a subset of the processed frames. The DQN agent model may include a hybrid arrangement of a multi-spatial attention network and a LSTM network to extract features from the frames of the immersive content to be used in the generation of the one or more predictions.

In accordance with an embodiment, the circuitry 202 may be further configured to execute the first neural network-based analysis that may include an extraction of temporal features associated with the virtual object from the immersive content, an extraction of spatial features associated with the virtual object from the immersive content, an application of a first Bi-LSTM model on the temporal features to generate a first prediction, an application of a self-attention transformer model on the spatial features to generate a second prediction and an application of a final output layer on the first prediction and the second prediction to determine the physical attributes.

In accordance with an embodiment, the circuitry 202 may be further configured to execute the second neural network-based analysis that may include an extraction of frames from the immersive content and an application of a convolution transformer model on the frames to determine the scene information. The convolution transformer model may include a feature extraction network that may use an attention-based CNN to extract feature vectors, a dimensionality reduction model to transform the extracted feature vectors, and a transformer decoder that may use the transformed feature vectors to output the scene information.

In accordance with an embodiment, the circuitry 202 may be further configured to execute the third neural network-based analysis that may include an extraction of frames from the immersive content, an extraction of spatiotemporal features associated with the digital avatar from the immersive content, an application of a second Bi-LSTM model on a temporal portion of the spatiotemporal features to generate a first result, an application of a CNN with attention mechanism on a spatial portion of the spatiotemporal features to output a second result, an application of a transformer encoder on the first result and the second result to generate a transformer result, and an application of a classifier on the transformer result to generate a label that indicates the activity that the digital avatar may be engaged in at the time-instant.

In accordance with an embodiment, the circuitry 202 may be further configured to acquire, based on the detection of the interaction, information associated with a movement of at least one body part of the user from a sensor worn by the user. The acquired information may be further associated with a temperature of the at least one body part. The circuitry 202 may be further configured to prepare an input for a HAE model based on the acquired information. The circuitry 202 may be further configured to feed the prepared input to the HAE model. The circuitry 202 may be further configured to generate, as an output of the HAE model for the prepared input, a prediction that may include force and pressure values to be applied by the haptic device 106 in an event where the digital avatar comes in a contact with the virtual object in the duration of the interaction. The circuitry 202 may be further configured to generate the feedback signal further based on an application of a HRNN on data that includes the prediction from the HAE model, the scene information, and the physical attributes. The feedback signal may include a touch feedback component and a thermal feedback component The HAE model may include of a series of neural networks that may include a CNN, an LSTM network, an LSTM encoder, an LSTM decoder, and a dense layer.

In accordance with an embodiment, the circuitry 202 may be further configured to generate embeddings based on at least one of the physical attributes of the virtual object, the scene information, and user actions included in the activity. The circuitry 202 may be further configured to apply a recommendation model on a state table comprising the embeddings to generate a set of recommendations for the digital avatar. The recommendation model may be a RL-based model. The RL-based model, when executed by the circuitry 202, may be configured to determine a match between the digital avatar and other digital avatars in the VR environment based on a GAN-based profile matching operation. The RL-based model may be further configured to apply, based on the embeddings, a collaborative filtering operation to determine a set of actions associated with the other digital avatars. The RL-based model may be further configured to output the set of actions as the set of recommendations for the digital avatar. The set of recommendations may include at least one of a set of actions that the digital avatar is likely to perform after the interaction, a first set of observations associated with a first set of changes in the physical attributes of the virtual object for a period in the duration of the VR session, and a second set of observations associated with a second set of changes in the scene information for a period in the duration of the VR session. The circuitry 202 may be further configured to control the VR device 104 to further render the set of recommendations.

In accordance with an embodiment, the circuitry 202 may be further configured to acquire first audio content associated with at least one of the scene information or the virtual object. The circuitry 202 may be further configured to prepare input data based on the first audio content. The circuitry 202 may be further configured to generate second audio content for the user based on an application of a SSGAN on the input data. The circuitry 202 may be further configured to control the VR device to playback of the second audio content in the duration of the activity.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. A system, comprising:
   circuitry configured to:
   detect a Virtual Reality (VR) session that is active on a VR device, wherein the VR device renders immersive content associated with a VR environment in a duration of the VR session, and
   the VR environment includes a digital avatar of a user who wears the VR device and a haptic device, and a virtual object that is representative of a real-world object in the VR environment;

acquire the immersive content based on the detection;
determine physical attributes associated with the virtual object based on a first neural network-based analysis of the immersive content;
determine scene information associated with the VR environment based on a second neural network-based analysis of the immersive content;
determine an activity that the digital avatar is engaged in at a time-instant based on a third neural network-based analysis of the immersive content;
detect, in a duration of the activity, an interaction between the digital avatar and the virtual object;
generate a feedback signal based on the interaction, the scene information, and the physical attributes; and
control the haptic device based on the feedback signal to generate a haptic feedback within a duration of the interaction.

2. The system according to claim 1, wherein the circuitry is further configured to detect the virtual object in the VR environment throughout the duration of the VR session.

3. The system according to claim 2, wherein the virtual object is detected by execution of a visual tracking operation that uses a Deep-Q-Network (DQN) agent model to process frames of the immersive content and to output one or more predictions to locate the virtual object for at least a subset of the processed frames.

4. The system according to claim 3, wherein the DQN agent model includes a hybrid arrangement of a multi-spatial attention network and a Long-Short Term Memory (LSTM) network to extract features from the frames of the immersive content to be used in a generation of the one or more predictions.

5. The system according to claim 1, wherein the circuitry is further configured to execute the first neural network-based analysis that includes:
an extraction of temporal features associated with the virtual object from the immersive content,
an extraction of spatial features associated with the virtual object from the immersive content,
an application of a first Bi-LSTM model on the temporal features to generate a first prediction,
an application of a self-attention transformer model on the spatial features to generate a second prediction, and
an application of a final output layer on the first prediction and the second prediction to determine the physical attributes.

6. The system according to claim 1, wherein the circuitry is further configured to execute the second neural network-based analysis that includes:
an extraction of frames from the immersive content, and
an application of a convolution transformer model on the frames to
determine the scene information, wherein the convolution transformer model includes:
a feature extraction network that uses an attention-based convolutional neural network (CNN) to extract feature vectors, and
a dimensionality reduction model to transform the extracted feature vectors, and
a transformer decoder that uses the transformed feature vectors to output the scene information.

7. The system according to claim 1, wherein the circuitry is further configured to execute the third neural network-based analysis that includes:
an extraction of frames from the immersive content, and
an extraction of spatiotemporal features associated with the digital avatar from the immersive content,
an application of a second Bi-LSTM model on a temporal portion of the spatiotemporal features to generate a first result,
an application of a convolutional neural network (CNN) with an attention mechanism on a spatial portion of the spatiotemporal features to output a second result,
an application of a transformer encoder on the first result and the second result to generate a transformer result, and
an application of a classifier on the transformer result to generate a label that indicates the activity that the digital avatar is engaged in at the time-instant.

8. The system according to claim 1, wherein the circuitry is further configured to:
acquire, based on the detection of the interaction, information associated with a movement of at least one body part of the user from a sensor worn by the user;
prepare an input for a Hybrid Auto Encoder (HAE) model based on the acquired information;
feed the prepared input to the HAE model;
generate, as an output of the HAE model for the prepared input, a prediction that includes force and pressure values to be applied by the haptic device in an event where the digital avatar comes in a contact with the virtual object in the duration of the interaction; and
generate the feedback signal further based on an application of a Hybrid Recurrent Neural Network (HRNN) on data that includes the prediction from the HAE model, the scene information, and the physical attributes.

9. The system according to claim 8, wherein the HAE model comprises of a series of neural networks that includes:
a convolutional neural network (CNN),
a Long Short-Term Memory (LSTM) network,
an LSTM encoder,
an LSTM decoder, and
a dense layer.

10. The system according to claim 8, wherein the acquired information is further associated with a temperature of the at least one body part and the feedback signal include a touch feedback component and a thermal feedback component.

11. The system according to claim 1, wherein the haptic feedback includes at least one of a kinesthetic feedback, a tactile feedback, or a thermal feedback.

12. The system according to claim 1, wherein the circuitry is further configured to:
generate embeddings based on at least one of the physical attributes of the virtual object, the scene information, and user actions included in the activity;
apply a recommendation model on a state table comprising the embeddings to generate a set of recommendations for the digital avatar; and
control the VR device to further render the set of recommendations.

13. The system according to claim 12, wherein the recommendation model is a reinforcement learning (RL)-based model that, when executed by the circuitry, is configured to:
determine a match between the digital avatar and other digital avatars in the VR environment based on a Generative Adversarial Network (GAN)-based profile matching operation;
apply, based on the embeddings, a collaborative filtering operation to determine a set of actions associated with the other digital avatars; and
output the set of actions as the set of recommendations for the digital avatar.

14. The system according to claim 12, wherein the set of recommendations include at least one of:
- a set of actions that the digital avatar is likely to perform after the interaction,
- a first set of observations associated with a first set of changes in the physical attributes of the virtual object for a period in the duration of the VR session, or
- a second set of observations associated with a second set of changes in the scene information for a period in the duration of the VR session.

15. The system according to claim 1, wherein the circuitry is further configured to:
- acquire first audio content associated with at least one of the scene information or the virtual object;
- prepare input data based on the first audio content;
- generate second audio content for the user based on an application of a self-supervised generative adversarial network (SSGAN) on the input data; and
- control the VR device to playback of the second audio content in the duration of the activity.

16. A method, comprising:
in a system:
- detecting a Virtual Reality (VR) session that is active on a VR device, wherein the VR device renders immersive content associated with a VR environment in a duration of the VR session, and
  - the VR environment includes a digital avatar of a user who wears the VR device and a haptic device, and a virtual object that is representative of a real-world object in the VR environment;
- acquiring the immersive content based on the detection;
- determining physical attributes associated with the virtual object based on a first neural network-based analysis of the immersive content;
- determining scene information associated with the VR environment based on a second neural network-based analysis of the immersive content;
- determining an activity that the digital avatar is engaged in at a time-instant based on a third neural network-based analysis of the immersive content;
- detecting, in a duration of the activity, an interaction between the digital avatar and the virtual object;
- generating a feedback signal based on the interaction, the scene information, and the physical attributes; and
- controlling the haptic device based on the feedback signal to generate a haptic feedback within a duration of the interaction.

17. The method according to claim 16, further comprising detecting the virtual object in the VR environment throughout the duration of the VR session.

18. The method according to claim 17, wherein the virtual object is detected by execution of a visual tracking operation that uses a Deep-Q-Network (DQN) agent model to process frames of the immersive content and to output one or more predictions to locate the virtual object for at least a subset of the processed frames.

19. The method according to claim 18, wherein the DQN agent model includes a hybrid arrangement of a multi-spatial attention network and a Long-Short Term Memory (LSTM) network to extract features from the frames of the immersive content to be used in a generation of the one or more predictions.

20. A non-transitory computer-readable medium having stored thereon, computer-executable instructions that when executed by a system, causes the system to execute operations, the operations comprising:
- detecting a Virtual Reality (VR) session that is active on a VR device, wherein the VR device renders immersive content associated with a VR environment in a duration of the VR session, and
  - the VR environment includes a digital avatar of a user who wears the VR device and a haptic device, and a virtual object that is representative of a real-world object in the VR environment;
- acquiring the immersive content based on the detection;
- determining physical attributes associated with the virtual object based on a first neural network-based analysis of the immersive content;
- determining scene information associated with the VR environment based on a second neural network-based analysis of the immersive content;
- determining an activity that the digital avatar is engaged in at a time-instant based on a third neural network-based analysis of the immersive content;
- detecting, in a duration of the activity, an interaction between the digital avatar and the virtual object;
- generating a feedback signal based on the interaction, the scene information, and the physical attributes; and
- controlling the haptic device based on the feedback signal to generate a haptic feedback within a duration of the interaction.

* * * * *